Nov. 28, 1961 F. A. DAHMS ET AL 3,010,499
AUTOMATIC SLICING MACHINE FOR A MEAT PRODUCT OR THE LIKE
Filed Feb. 20, 1956 18 Sheets-Sheet 3

INVENTORS
FRANCIS A. DAHMS
THOMAS WAUGH
BY Bates & Willard
ATTORNEYS

Nov. 28, 1961   F. A. DAHMS ET AL   3,010,499
AUTOMATIC SLICING MACHINE FOR A MEAT PRODUCT OR THE LIKE
Filed Feb. 20, 1956   18 Sheets-Sheet 4

INVENTORS
FRANCIS A. DAHMS
THOMAS WAUGH
BY Bates & Willard
ATTORNEYS

Nov. 28, 1961    F. A. DAHMS ET AL    3,010,499
AUTOMATIC SLICING MACHINE FOR A MEAT PRODUCT OR THE LIKE
Filed Feb. 20, 1956    18 Sheets-Sheet 6

INVENTORS
FRANCIS A. DAHMS
THOMAS WAUGH
BY Bates + Willard
ATTORNEYS

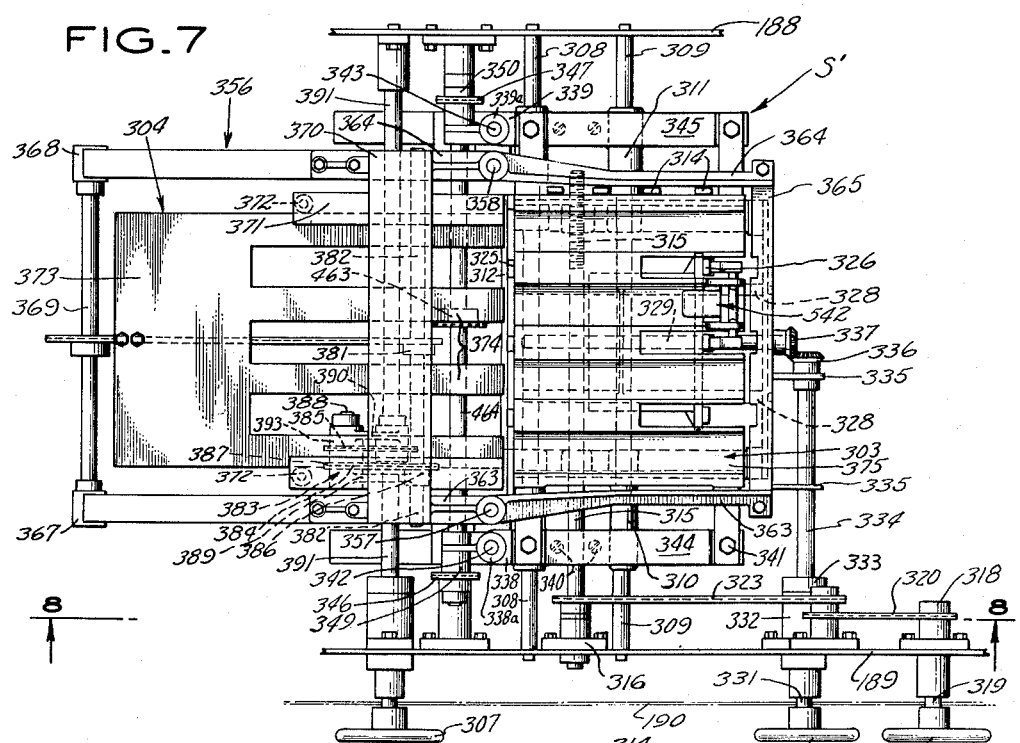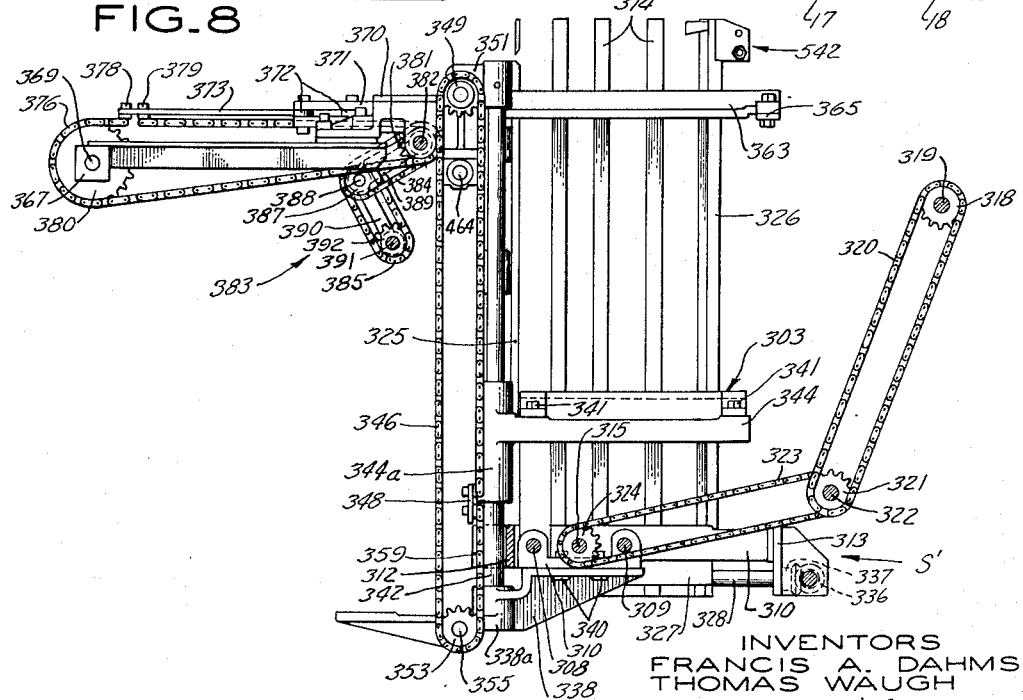

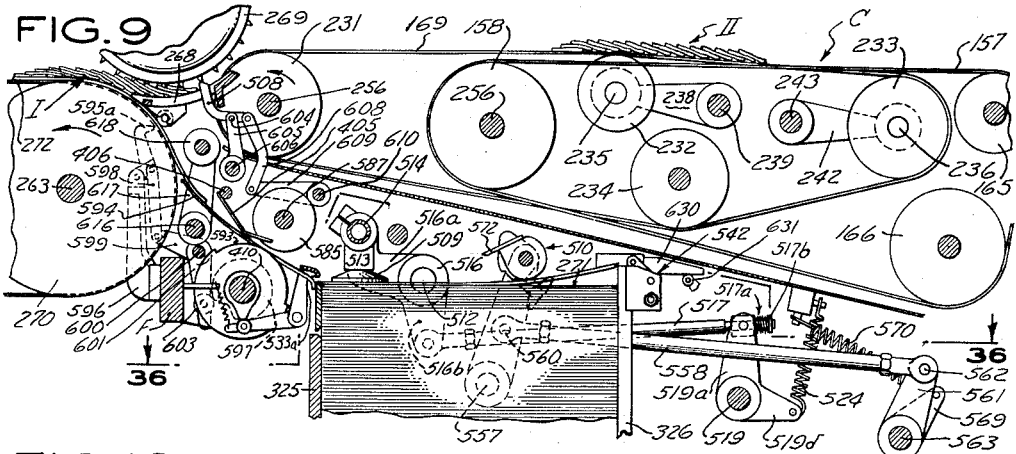
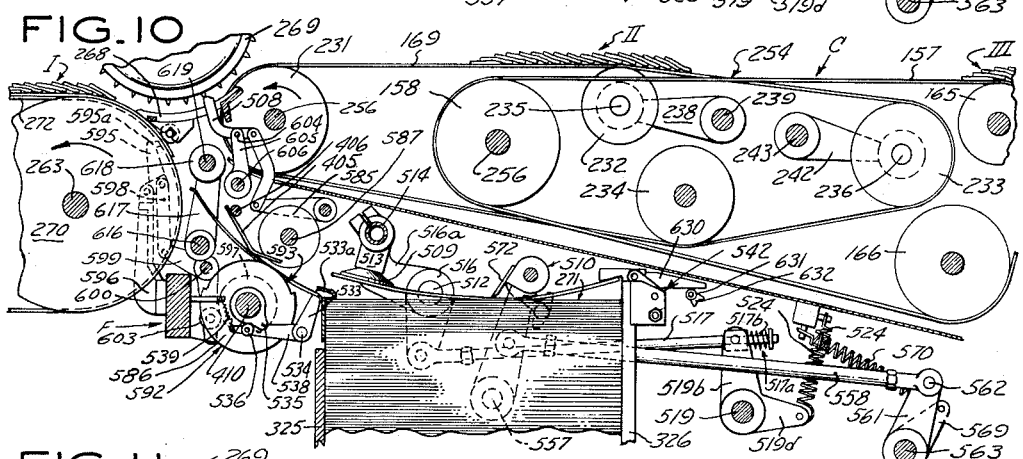
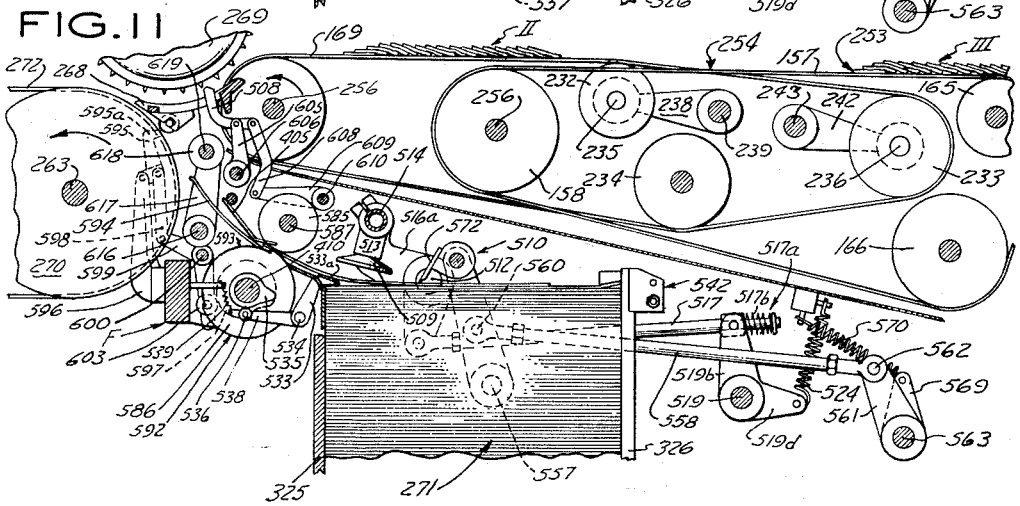

Nov. 28, 1961   F. A. DAHMS ET AL   3,010,499
AUTOMATIC SLICING MACHINE FOR A MEAT PRODUCT OR THE LIKE
Filed Feb. 20, 1956   18 Sheets-Sheet 9
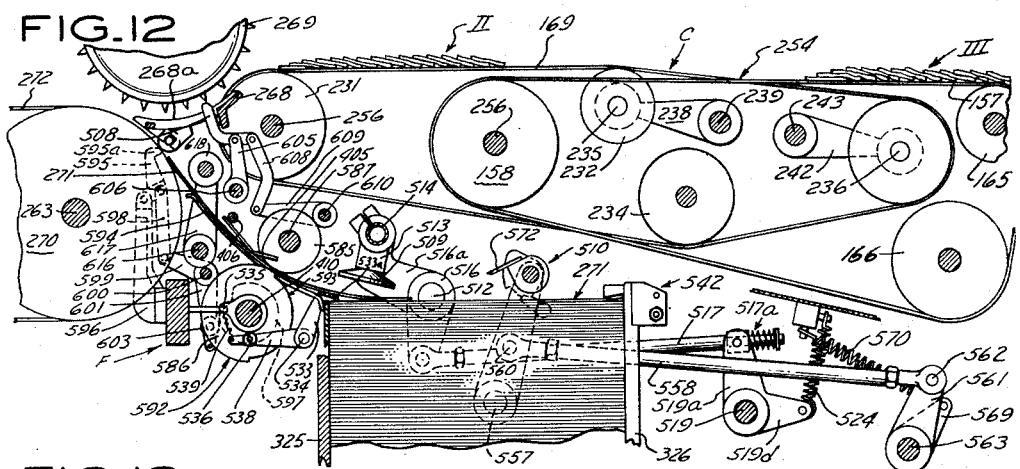
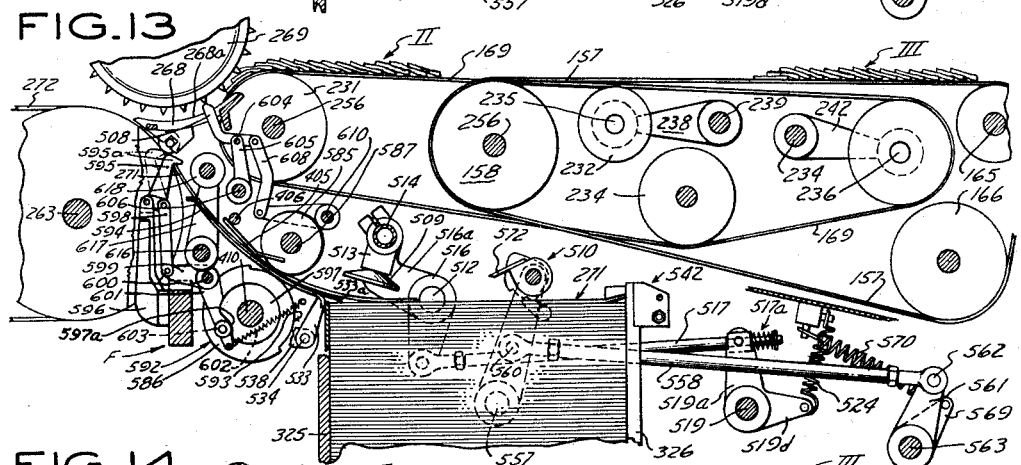
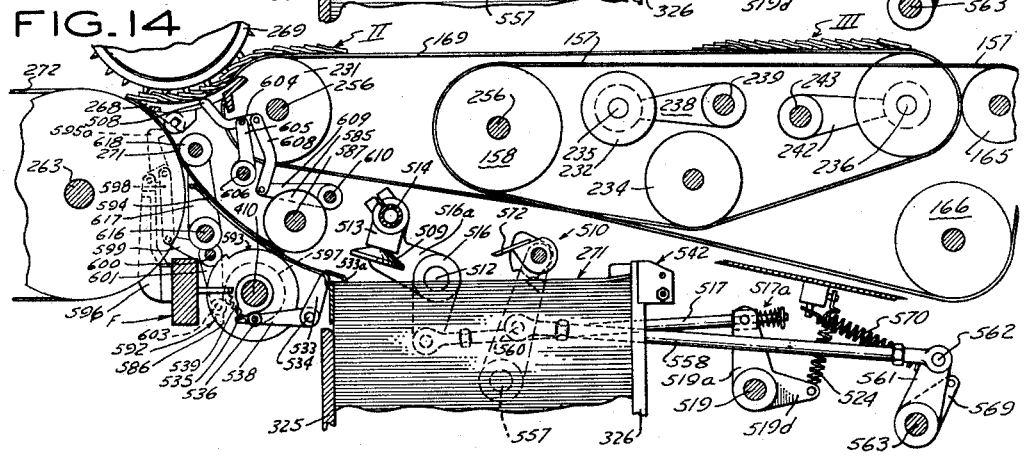
INVENTORS
FRANCIS A. DAHMS
THOMAS WAUGH
BY Bates & Willard
ATTORNEYS Nov. 28, 1961 F. A. DAHMS ET AL 3,010,499
AUTOMATIC SLICING MACHINE FOR A MEAT PRODUCT OR THE LIKE
Filed Feb. 20, 1956 18 Sheets-Sheet 10
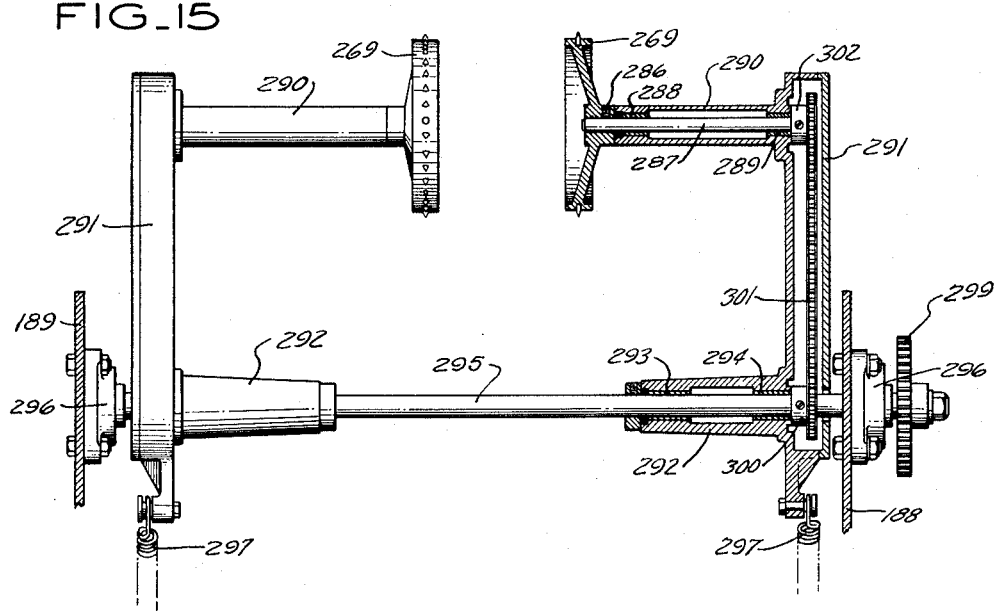
FIG_15
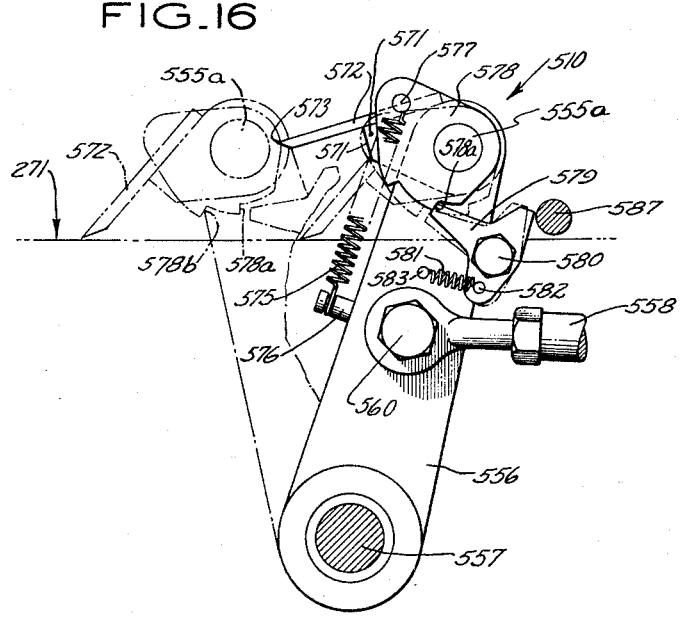
FIG_16
INVENTORS
FRANCIS A. DAHMS
THOMAS WAUGH
BY Bates + Willard
ATTORNEYS INVENTORS
FRANCIS A. DAHMS
THOMAS WAUGH
BY Bates & Willard
ATTORNEYS Nov. 28, 1961   F. A. DAHMS ET AL   3,010,499
AUTOMATIC SLICING MACHINE FOR A MEAT PRODUCT OR THE LIKE
Filed Feb. 20, 1956   18 Sheets-Sheet 12

INVENTORS
FRANCIS A. DAHMS
THOMAS WAUGH
BY Bates & Willard
ATTORNEYS

INVENTORS
FRANCIS A. DAHMS
THOMAS WAUGH
BY Bates + Willard
ATTORNEYS

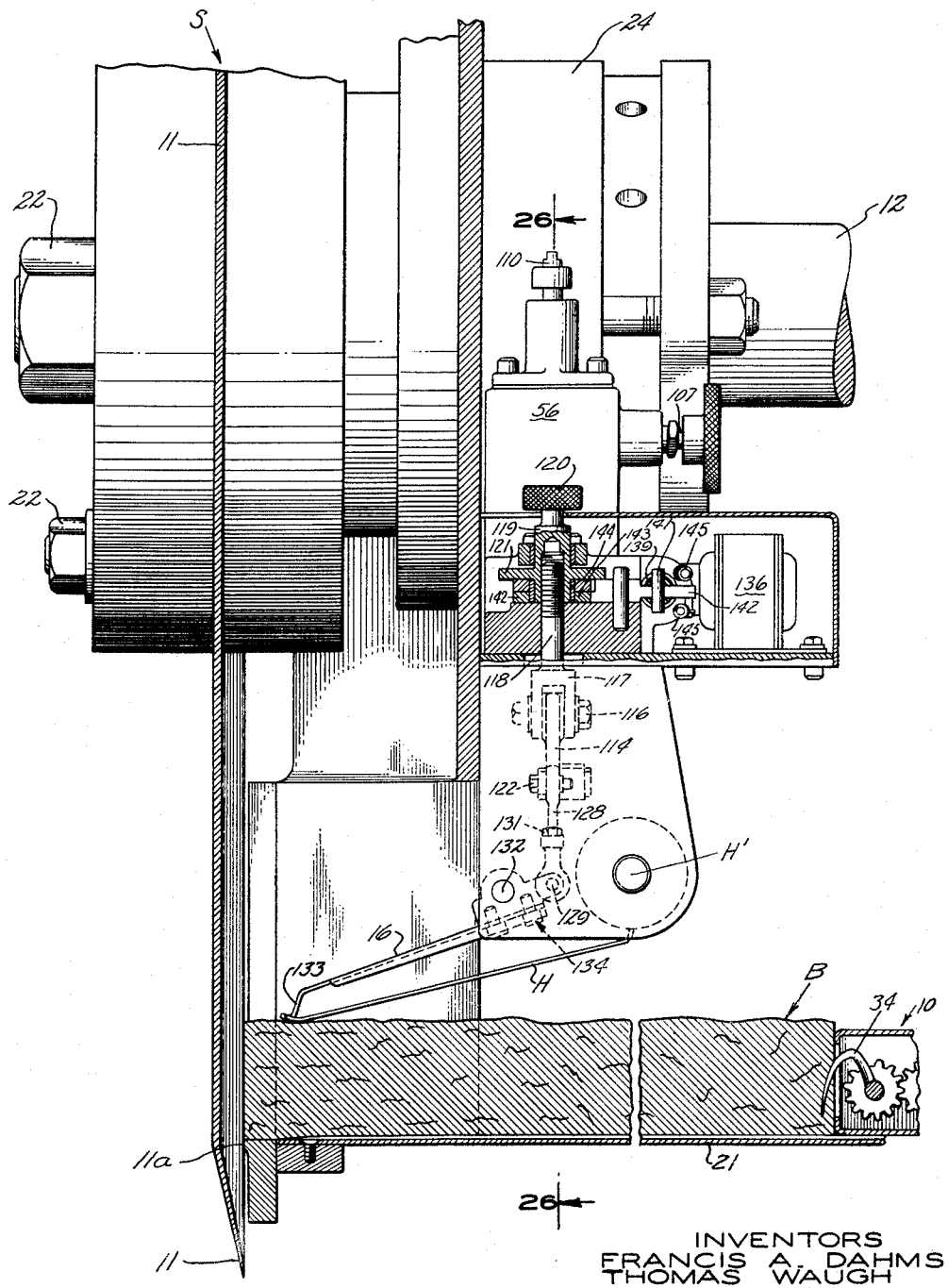

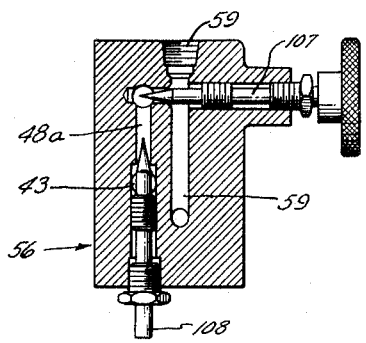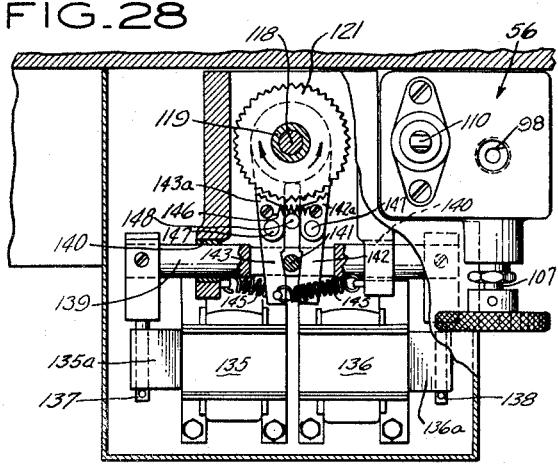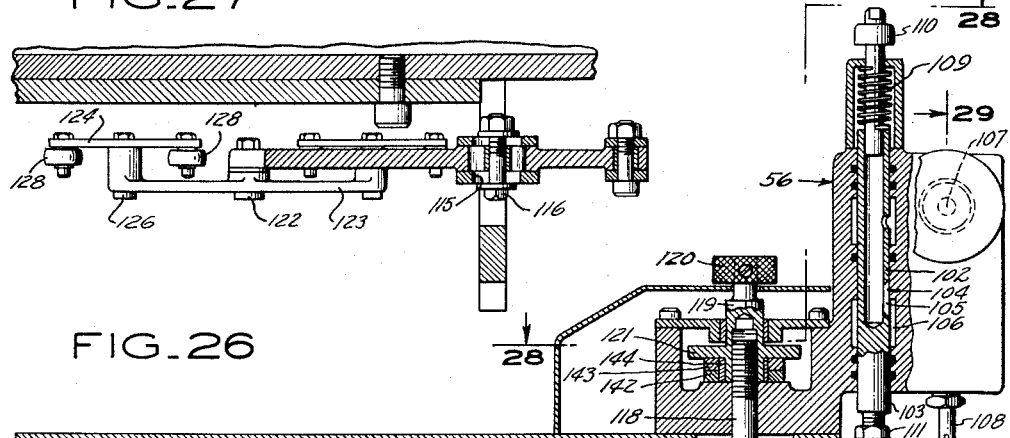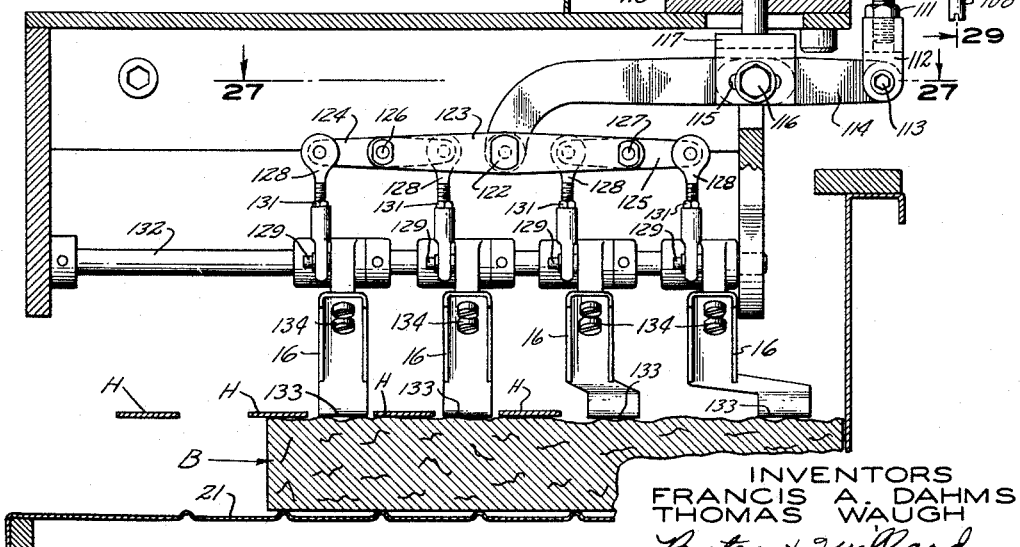

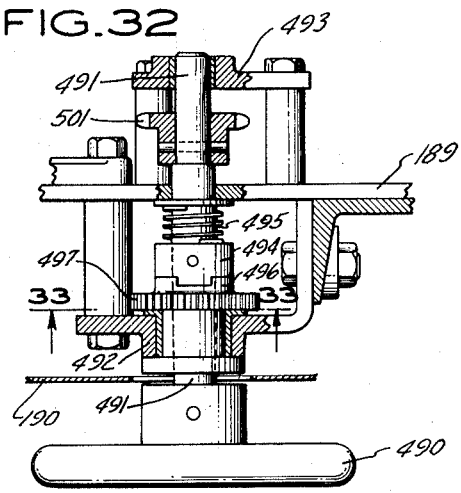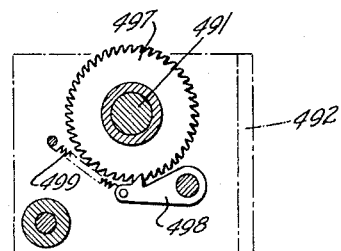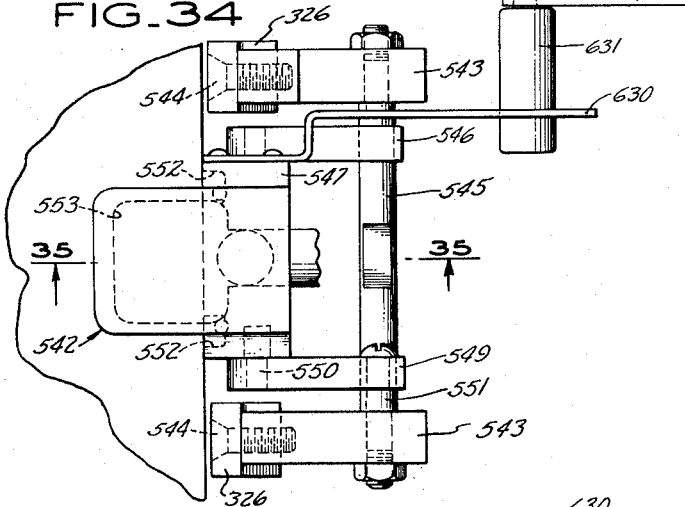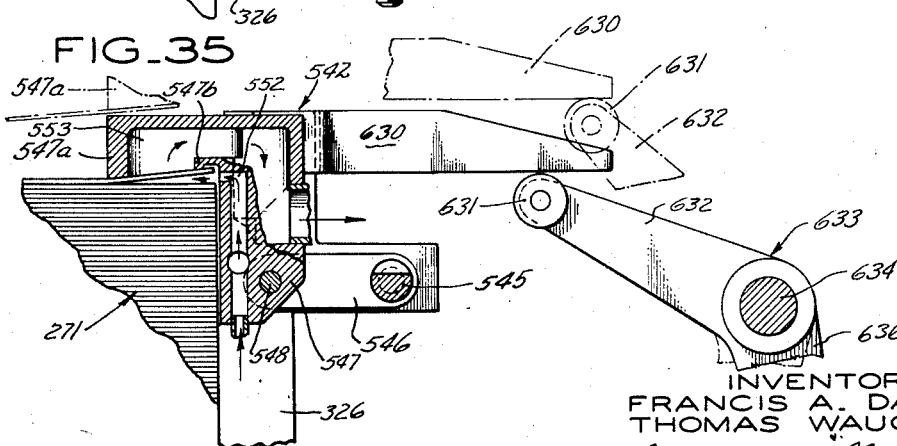

INVENTORS
FRANCIS A. DAHMS
THOMAS WAUGH

BY *Bates & Willard*
ATTORNEYS

United States Patent Office 3,010,499
Patented Nov. 28, 1961

3,010,499
AUTOMATIC SLICING MACHINE FOR A MEAT PRODUCT OR THE LIKE
Francis A. Dahms, Tariffville, and Thomas Waugh, West Hartford, Conn., assignors to Emhart Manufacturing Company, Hartford, Conn., a corporation of Delaware
Filed Feb. 20, 1956, Ser. No. 566,451
15 Claims. (Cl. 146—94)

The present invention relates to automatic equipment for feeding, handling and weighing materials, and particularly food materials such as bacon, pressed meats, hams, cheeses and the like, and more particularly to machines of the type indicated in which bacon or other product is automatically sliced, and the sliced product is automatically shingled and placed on paper board, and wherein the machine automatically controls and registers the exact weight of each package, so as to require a minimum amount of manual control and correction.

A principal object of the invention is to reduce costs of slicing and packaging bacon and the like and to more accurately and automatically weigh and control the weight of the packages.

A further object is to provide automatic means for preparing shingled bacon (overlapped slices) in packages of selected weights, as for example pound and half pound packages, on paper board ready for overwrapping.

Machines of the type indicated and incorporating the present invention have the advantage of providing packages of assured weights and in which overweight is reduced to a minimum. The machine consistently indicates the correction, if any, which the operator must make to bring each package to correct weight.

A further object of the invention is the provision of a machine of the character described in which successive packages are automatically weighed and the weight of each package is indicated at correcting stations where the packages are corrected to a desired weight.

A further object is the provision in the machine of automatic feed control mechanism responsive to variations in volume and, more particularly in the case of bacon handling equipment, responsive to variations in the shape and size of the bacon slab fed to the slicer.

A still further object is the provision in bacon handling machinery and the like of feed control mechanism including means for selecting the number of slices per package, and for controlling package weight without varying the number of the slices in a package and without an excessively thick or thin slice, or otherwise notable variation in the thickness of any of the slices in a package.

Still another object is the provision of conveyor mechanism in machines of the character described in which a first-speed conveyor provides the shingle pattern in that it spaces the slices of bacon, and a second-speed conveyor receives and modifies the spacing between groups of slices without modifying the spacing of the slices in the group.

A superior appearance is found in shingled bacon packages prepared with machinery embodying the invention.

Efficient production is possible because machines embodying the invention "pace" the operators.

Moreover, the invention provides machine compactness with attendant savings in floor space occupied and personnel required for operation.

It should be understood that the above identified objects and advantages are illustrative and that modifications applicable to automatic handling of many types of materials other than bacon and the like are contemplated.

Moreover, numerous additional objects and advantages will be apparent from the following description of an illustrative embodiment of the invention, the scope of which is defined by the appended claims, and the description of which is made with reference to the accompanying drawings in which:

FIG. 7 is a top plan view of elevating mechanism for the paper board;

FIG. 8 is a cross-section view of the elevating mechanism taken generally on line 8—8 of FIG. 7;

Figure 2:
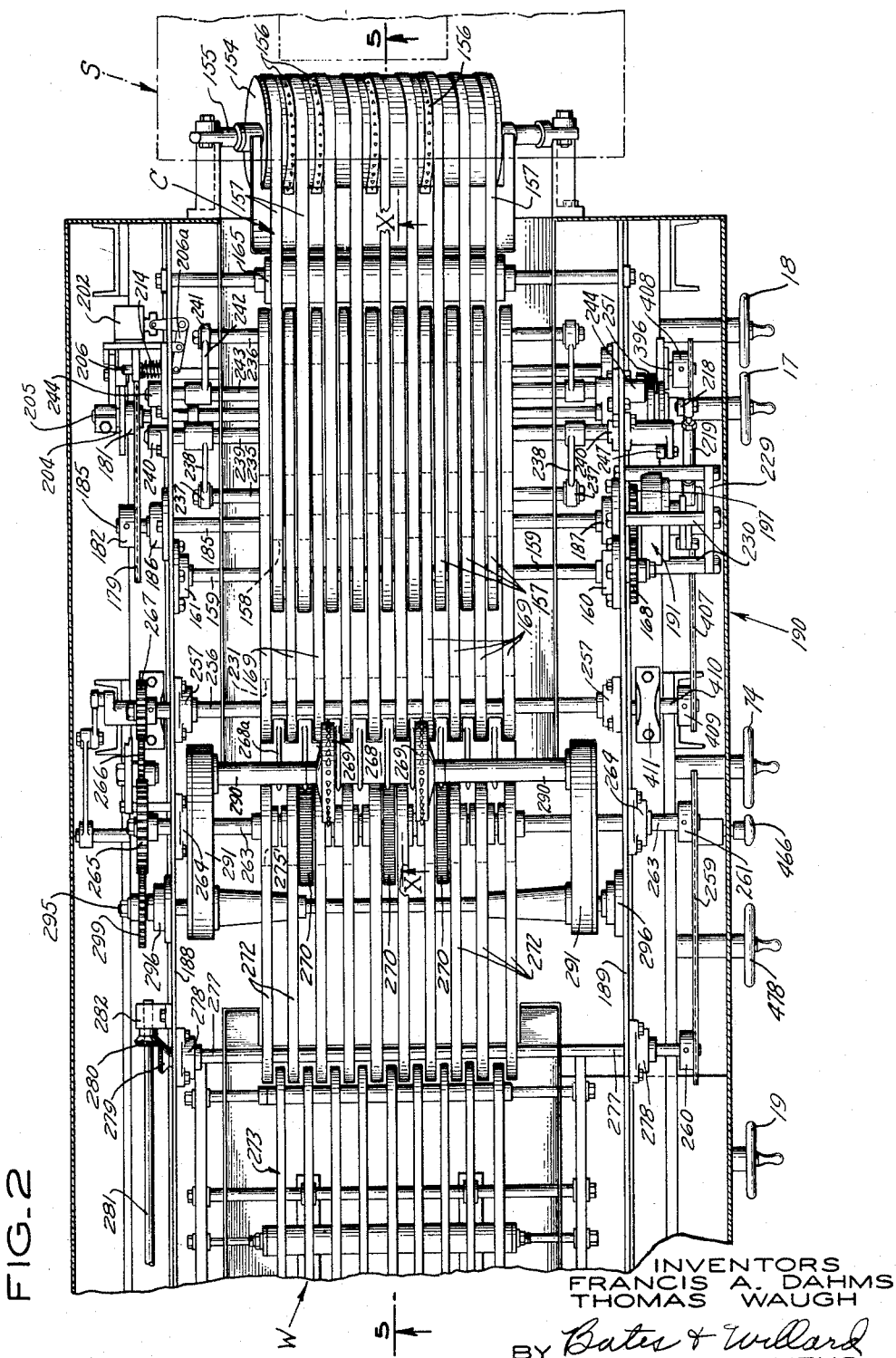
FIG. 2 is an enlarged top plan view of a center portion of the machine, including portions of belt conveyors, paper board feed and weighing apparatus.
Figure 3:
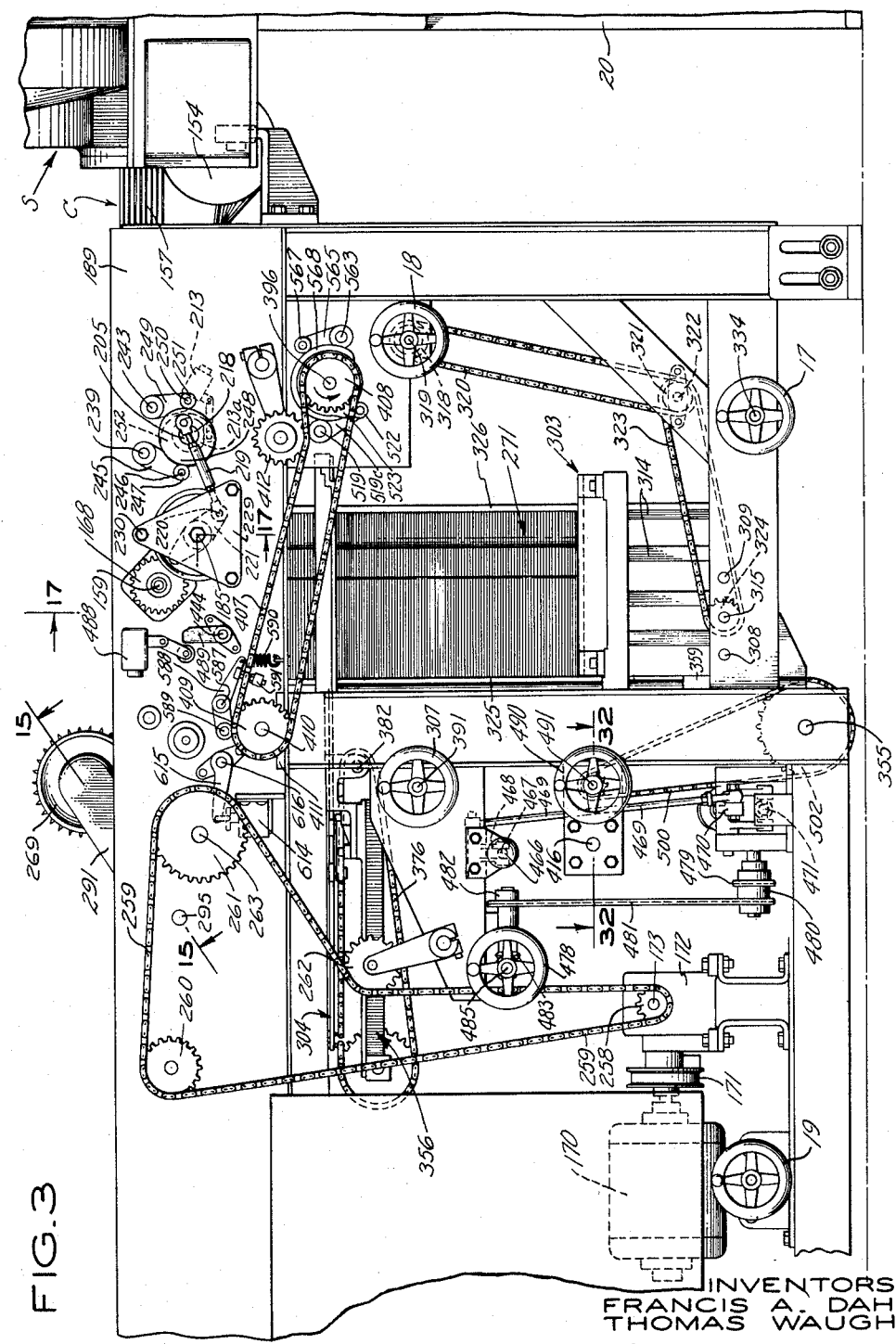
FIG. 3 is a front elevation view of the central portion of the machine as viewed from the bottom of FIG. 2.
Figure 6:
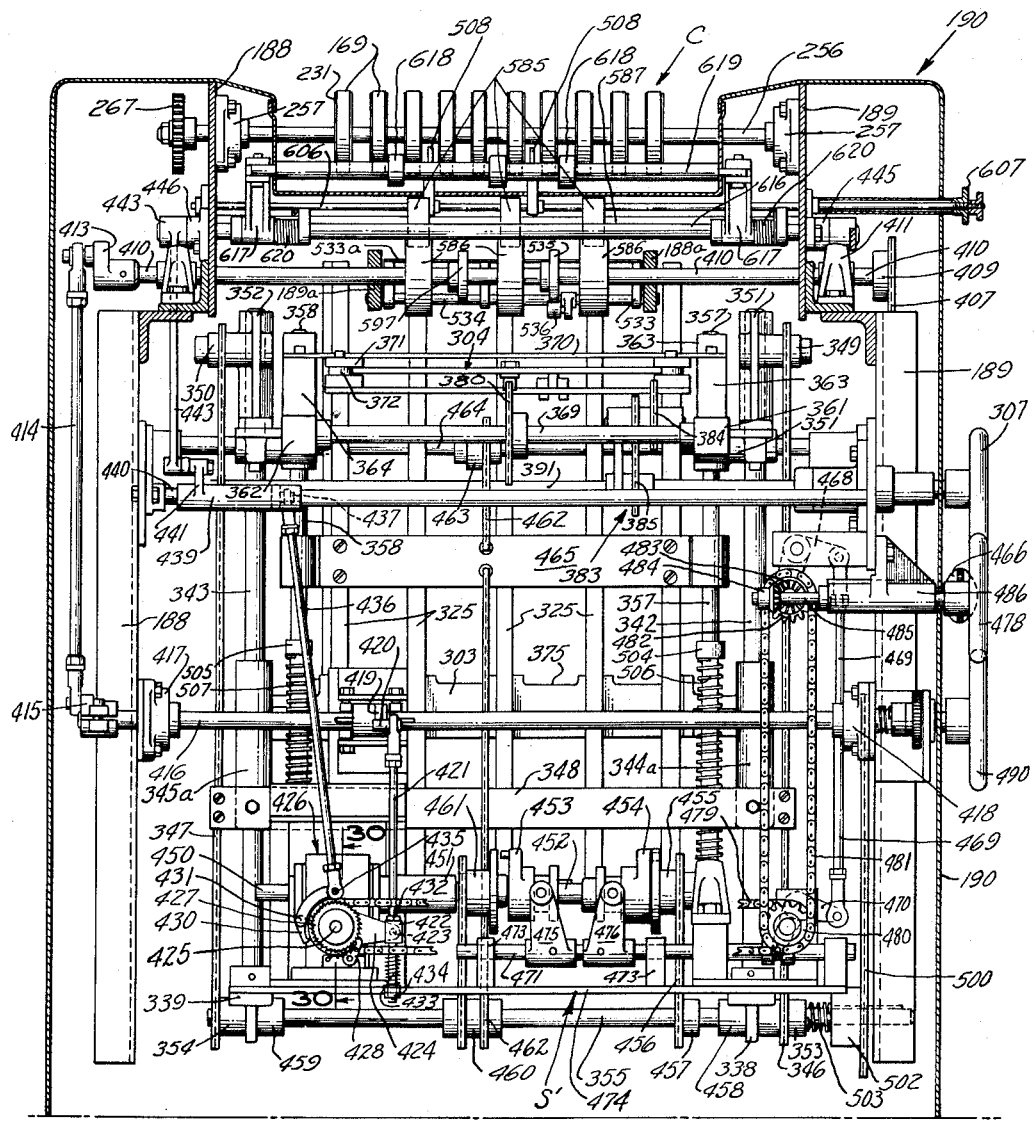
FIG. 6 is a cross-section view taken generally on the broken line of 6—6 of FIG. 5.
Figure 30:
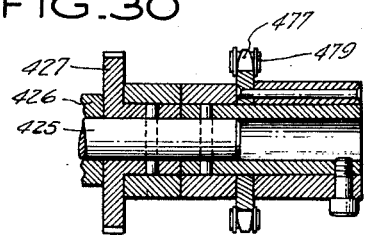
Figure 17:
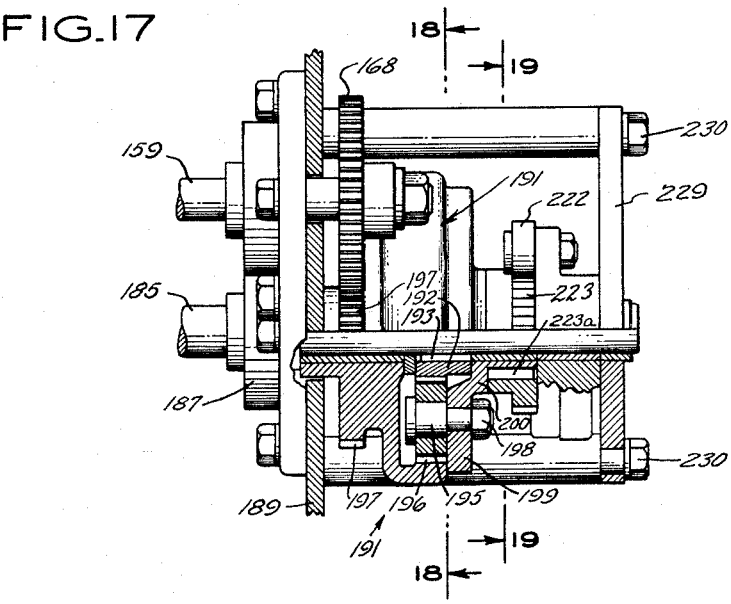
Figure 18:
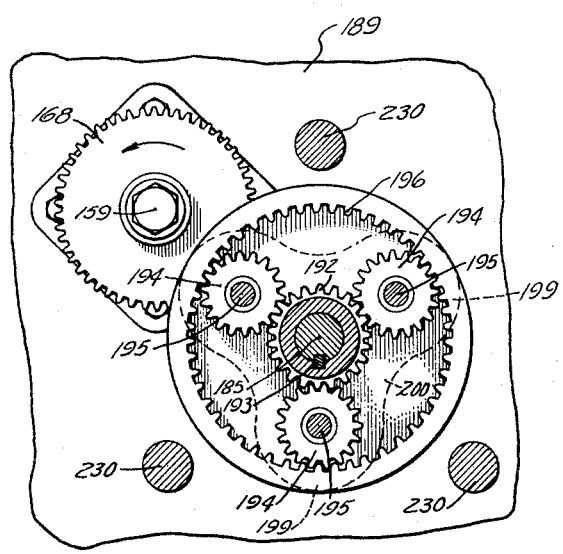
Figure 19:
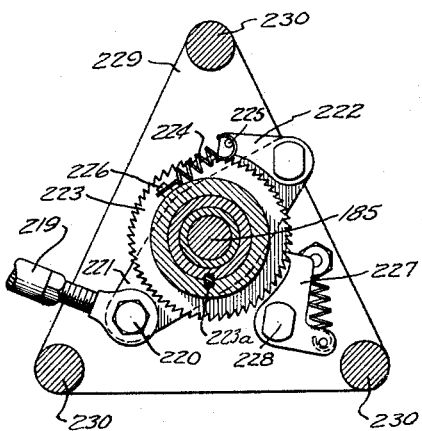
Figure 20:
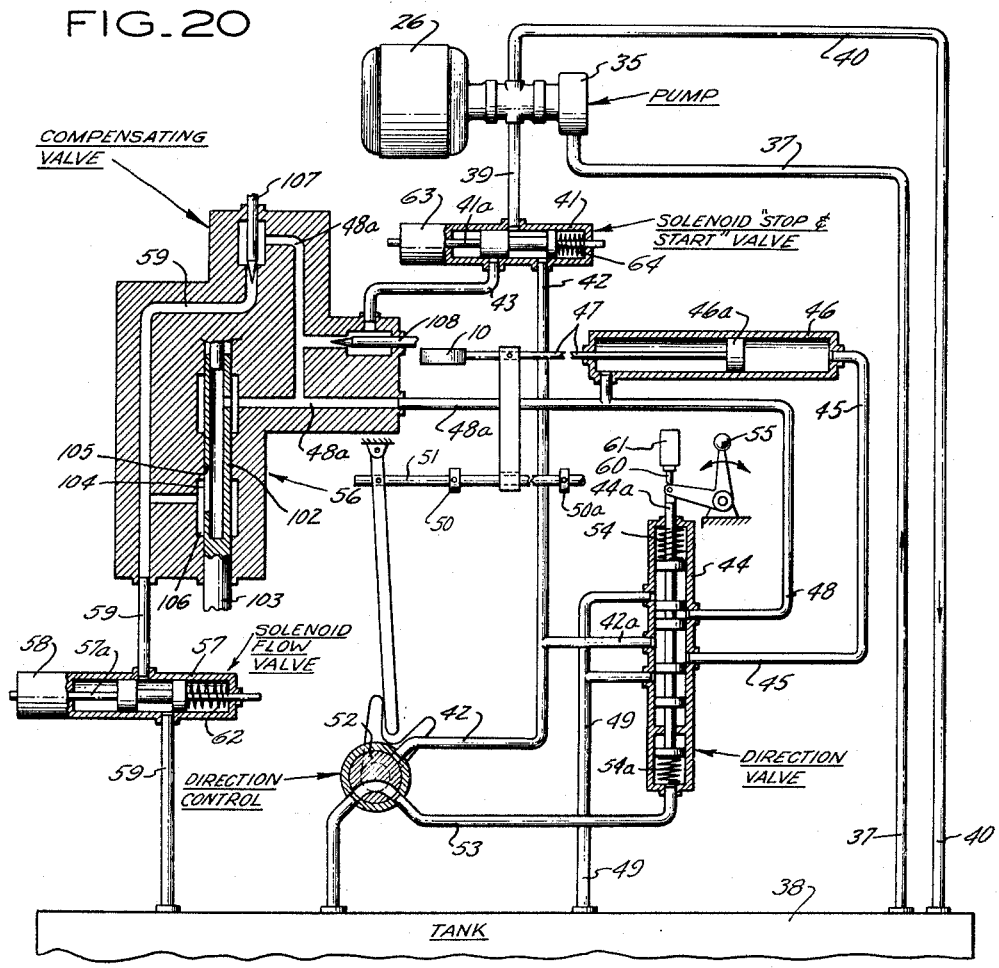
Figure 21:
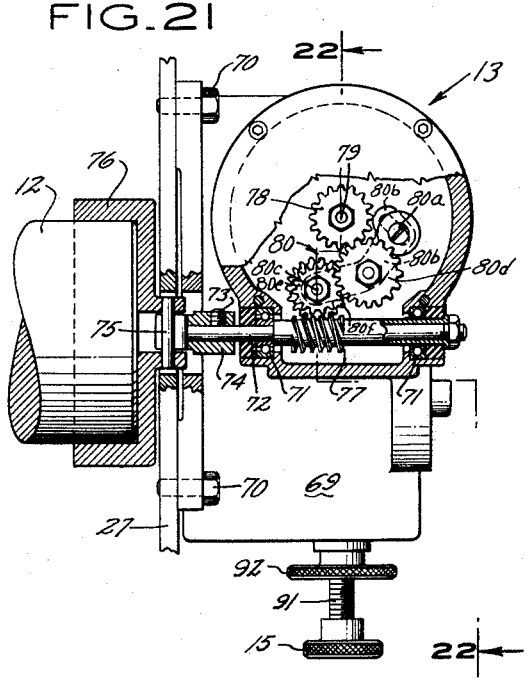
Figure 22:
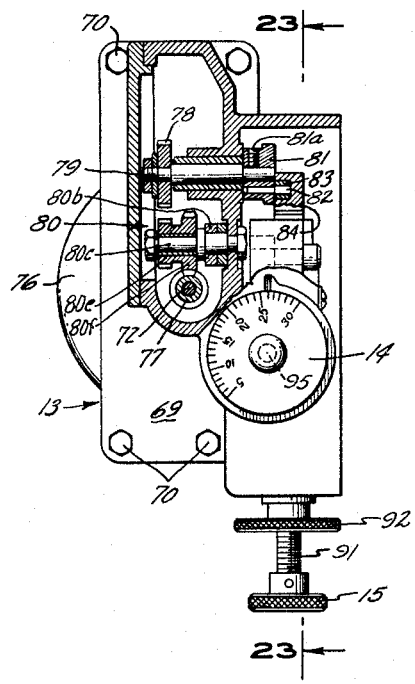
Figure 23:
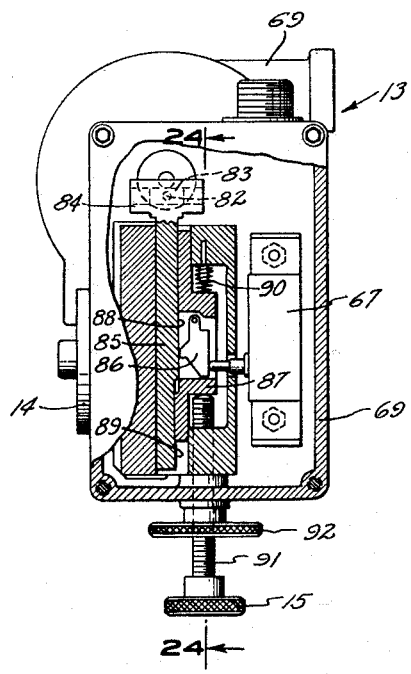
Figure 24:
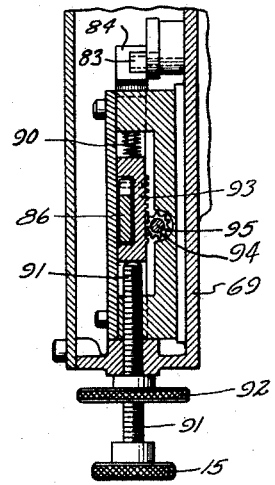
Figure 31:
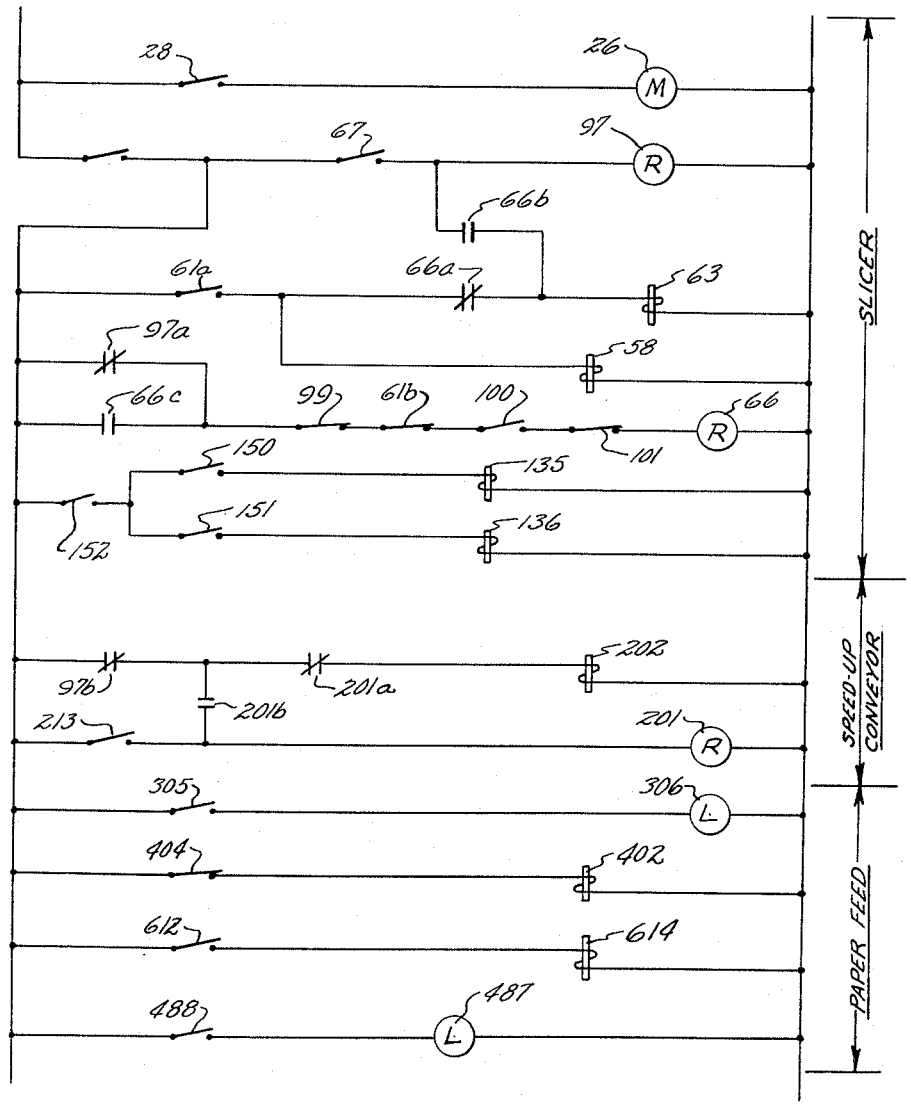

FIGS. 9–14, inclusive, are similar views partially schematic and taken generally on line X—X of FIG. 2 and showing successive operating positions of paper board feed mechanism;

FIG. 15 is a view taken generally on line 15—15 of FIG. 3 and in which the right-hand spiked wheel is in cross-section to show the drive and the left-hand wheel and arm is in full elevation;

FIG. 16 is an enlarged view including additional details of the paper board pusher blades shown in FIGS. 9–14;

FIG. 17 is an enlarged cross-section view taken on line 17—17 of FIG. 3 and showing planetary gearing and drive of a two-speed conveyor;

FIG. 18 is a cross-section view on line 18—18 of FIG. 17;

FIG. 19 is a cross-section view on line 19—19 of FIG. 17;

FIG. 20 is a schematic view of a hydraulic drive for the slicer ram and including portions of the slice counter and thickness controls;

FIG. 21 is a view partly in section of counter mechanism connected to the rear end of the slicer shaft for selecting the number of cutting revolutions per cycle;

FIG. 22 is a cross-section view of the counter mechanism taken on line 22—22 of FIG. 21;

FIG. 23 is a cross-section view taken on line 23—23 of FIG. 22;

FIG. 24 is a cross-section view taken on line 24—24 of FIG. 23;

FIG. 25 is an enlarged vertical cross-section view of a part of the slicer blade and shaft and a whiffle tree mechanism for gaging the mean thickness of the bacon slab and regulating the ram feed mechanism and bacon slice thickness;

FIG. 26 is a cross-section view taken generally on line 26—26 of FIG. 25;

FIGS, 27, 28, 29 are cross-section views taken on the respective lines 27—27, 28—28 and 29—29 of FIG. 26;

FIG. 30 is an enlarged cross-section view taken on line 30—30 of FIG. 6;

FIG. 31 is a simplified wiring diagram for the machine;

FIG. 32 is an enlarged cross-sectional view taken on line 32—32 of FIG. 3 showing details of mechanism for rapidly raising the principal feed table of paper board magazine manually;

FIG. 33 is a cross-sectional view taken on line 33—33 of FIG. 32;

FIG. 34 is enlarged plan view of mechanism for preventing paper boards from being fed more than one at a time to the bacon conveyor;

FIG. 35 is a cross-sectional view taken on line 35—35 of FIG. 34; and

Figure 36:
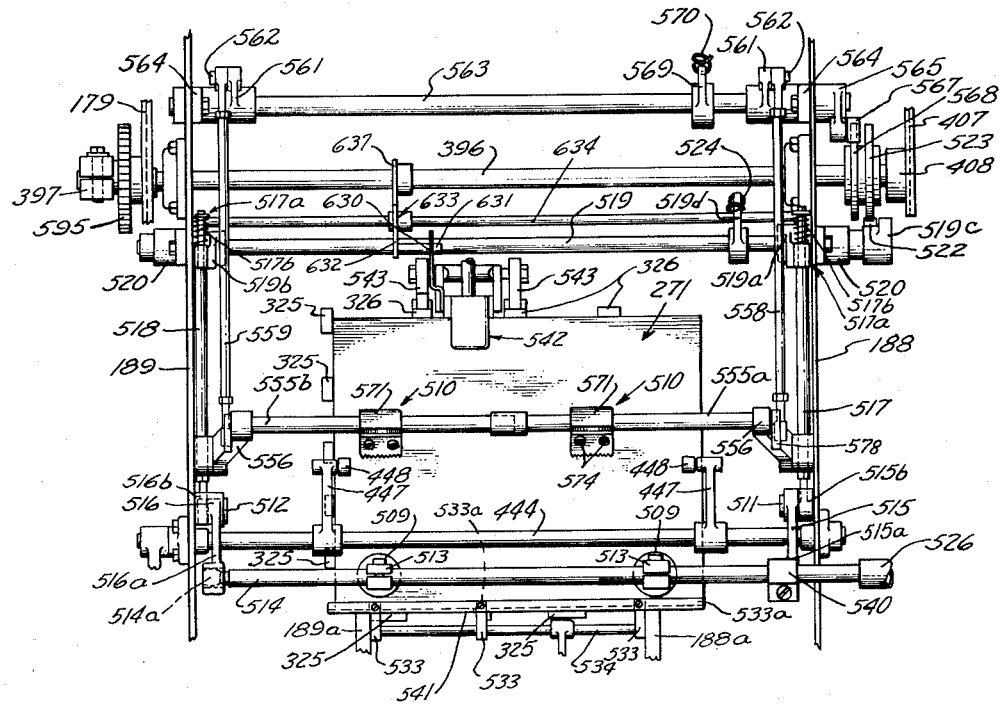
Figure 37:
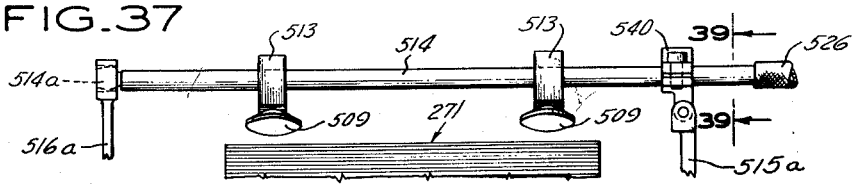
Figure 38:
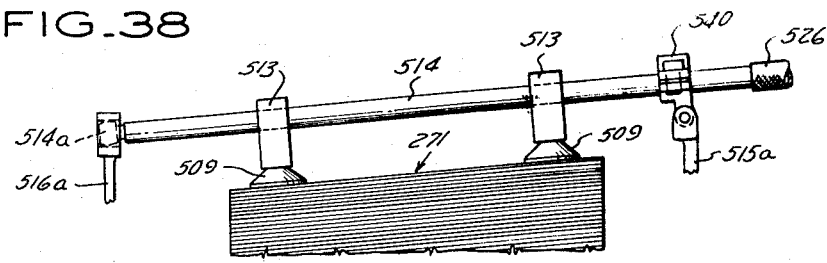
Figure 39:
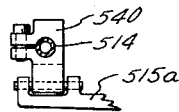

FIG. 36 is a top plan view of the paper board magazine feed as seen generally from line 36—36 of FIG. 9;

FIG. 37 is a front-elevational view of the pick-up bar and suction cups portion of the paper board feed;

FIG. 38 is a view similar to FIG. 37 showing the adaptability of the pick-up portion to a cocked stack of paper boards in the magazine; and FIG. 39 is a fragmentary cross section view taken on line 39—39 of FIG. 37 showing the hinged supporting structure for one end of the pick-up bar.

GENERAL DESCRIPTION

The illustrated machine includes a slicer, generally designated S, having a feeding ram or pusher 10 which intermittently advances a bacon slab B to slicing position relative to a slicer knife 11, and a conveyor, generally designated C, for receiving and automatically assembling successively cut slices of bacon in lapping or shingled relation.

In accordance with a preferred form of the invention, the intermittent feeding of the bacon slab B by the ram 10 to the knife 11 is coordinated with the movement of the conveyor C so that the bacon slices fall on the conveyor and are uniformly lapped or shingled a desired amount and in groups of a selected number of slices with each such group spaced apart from the preceding and following groups. Each of the groups or assemblies of lapped slices is carried by the conveyor C to a paper board feeder, generally designated F, where a paper board is automatically inserted under each group of shingled slices to form a package which is conveyed to an automatic weigher.

The weigher, generally designated W, indicates the over or under weight, if any, of each paper board and bacon assembly in suitable weight units, as for example whole and fractional slices of bacon, so that operators at correction stations readily may add or remove the bacon slices, or portions thereof, necessary to bring a package to a preselected correct weight before the package is delivered to a wrapping machine.

In order to selectively set the machine for a desired number of slices for each package, there is provided on the rear of the slicer shaft 12, a counter generally designated 13 (FIGS. 21-24), which includes a dial 14 for indicating the selected number of slices per package to which the counter is set by thumb screw 15.

Other adjustment features provided in the illustrated machine include means associated with the weigher W for regulating the speed of the ram or pusher 10 and consequently the weight, individually and as a result collectively, of the slices cut from the bacon slab B.

The speed of the ram 10 also is regulated in part by scanning fingers 16 (FIGS. 25 and 26) which comprise sensing means resiliently engaging a surface of the bacon slab to gauge changes in size of the bacon slab B and automatically vary the speed of the ram 10 to compensate for changes in the one or more cross sectional dimensions of the slab B and thereby maintain the weight of each slice and shingled group or package of slices as closely as possible to the preselected values.

In a preferred form, the machine is adaptable to handle bacon slabs within a wide range of widths and thicknesses and by adjustment of hand wheel 17 (FIGS. 1-3) to feed paper boards in sizes ranging from 6 x 8 to 11 x 14 inches.

The paper board feed F also is provided with a hand wheel 18 for adjusting the lateral location of the paper board relative to shingled bacon on the conveyor C.

Moreover, the speed of the conveyor C can be adjusted readily by hand wheel 19 to select the shingling pattern or amount of each bacon slice exposed and not covered by the following slice.

Slicer

Referring more particularly to FIGS. 1, 3, 25 and 26, the slicer S includes a base structure 20 having a table surface 21 on which a bacon slab B is advanced to the slicer blade 11 by the ram or pusher 10.

The blade 11 is suitably secured, as by nuts 22 to the slicer shaft 12, which is protected by an inverted channel guard 23 and journaled in suitable bearings 24 and 25 for rotation by motor 26 through suitable gearing (not shown) located within housing 27. The slicer motor 26 is energized and deenergized through a switch 28 (FIGS. 1 and 31) to rotate and stop the slicer blade 11. The blade 11 is shielded by a guard casing 29 for the protection of the operator.

The ram or pusher 10 is secured to a carriage 30 having a roller 31 which rolls on the table 21 and also having a channeled member 32 which straddles a guide rail 33 and guides the movement of the pusher 10 longitudinally on the table 21. The pusher 10 includes a group of pointed fingers or grippers 34 (FIG. 25) which swing downwardly and grip the bacon slab B during forward movement of the pusher 10 and pivot upwardly and release the slab when the pusher is retracted.

By means of hydraulic controls, which are generally illustrated in FIG. 20, the pusher 10 feeds the bacon slab B to the cutting knife at a preselected rate which is infinitely variable so that slice thickness may be controlled at any thickness and weight and at any desired number of slices to the pound.

The ram hydraulic system

More particularly, the hydraulic system shown in FIG. 20 constitutes a substantially constant force power means for advancing the product to be sliced and includes a hydraulic pump 35 driven by the electric motor 26, current to which is supplied and interrupted through the manually operable switch 28. The intake of the pump 35 is connected through an intake pipe 37 with a sump tank 38 for hydraulic fluid material, such as oil. The pump 35 includes controls for preselecting and maintaining a constant discharge pressure in outlet pipe 39 and an overflow pipe 40 for directing excess hydraulic fluid from the pump 35 back to the tank 38 so that the constant pressure is maintained in line 39 despite flow changes effected in the line 39 by changes in load on the line.

Figure 1:
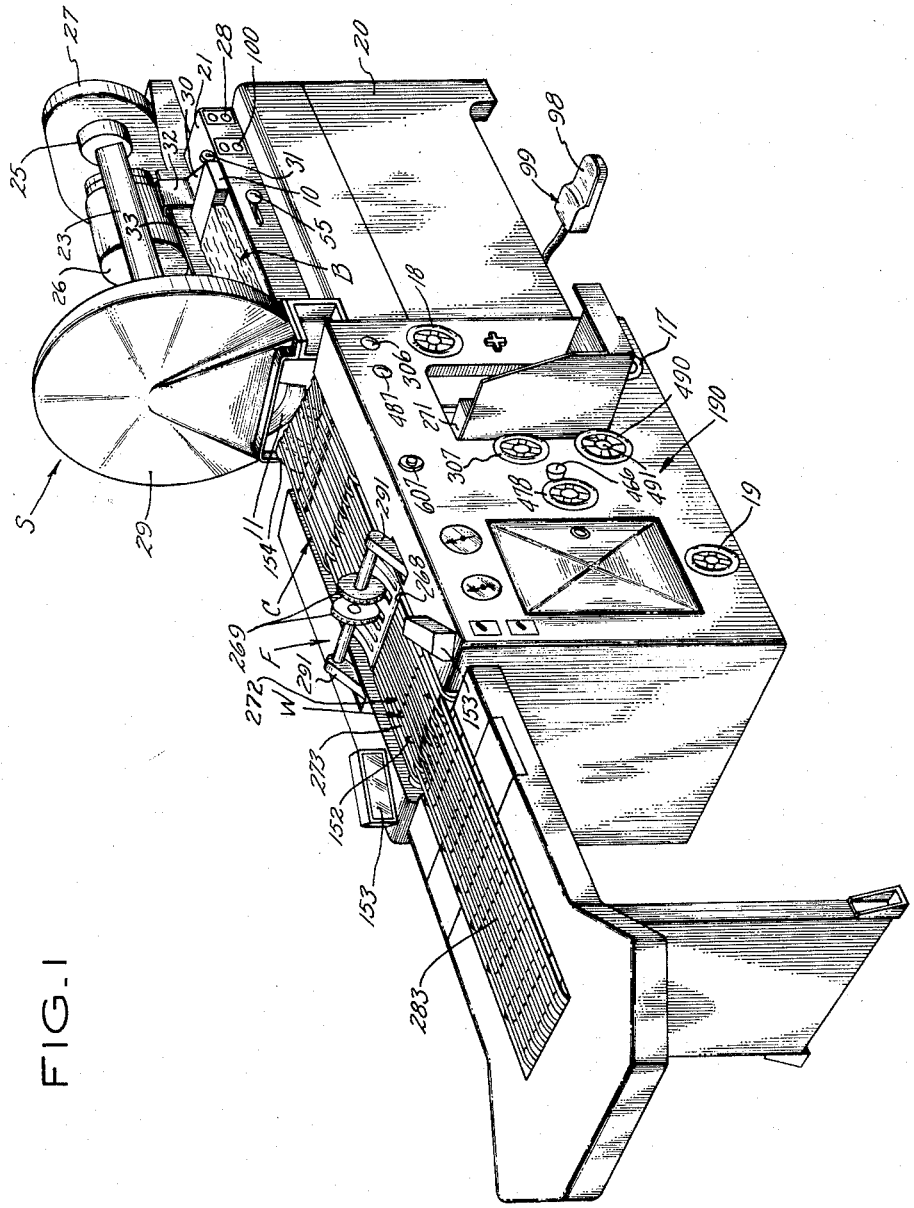
FIGURE 1 is a perspective view of a machine for automatically slicing, shingling, and weighing bacon, or the like, and placing a preselected quantity of the sliced and shingled product on a paper board.

As shown in FIG. 20, the constant pressure line 39 is connected to the inlet of a solenoid actuated two-way valve 41 having two outlet lines 42 and 43. A branch line 42a from the line 42 normally communicates through a spool valve 44, to the inlet line 45 of a fluid motor 46, the piston rod 47 of which advances and retracts the bacon feeding pusher 10 (FIG. 1).

The valve 41 controls the intermittent feed of the ram 10 and is operated by the counter 13 (FIG. 21) which is attached to the end of the shaft 12 on which the cutting blade 11 is secured. The counter 13 counts the revolutions of the blade 11 and in the illustrated embodiment is adjusted so as to set the valve 41 to advance the ram 10 for 20 revolutions of the blade 11 and then shift the valve 41 so that the ram is stationary for 16 revolutions of the blade. In this way, shingled bacon may be produced in groups of 20 slices with a gap equal to 16 slices between successive groups.

The bacon slab B is advanced by the ram 10 whenever the solenoid valve 41 and the spool valve 44 cooperate to connect the inlet line 45 of the ram motor 46 with the constant pressure hydraulic line 39 from the pump 35.

The valve 44 provides for selectively advancing and retracting the ram 10.

The ram 10 is retracted by shifting valve shaft 44a of the spool valve 44 from the position shown in FIG. 20 to a position in which the constant pressure line 42a is disconnected from line 45 and connected with a line 48 to the outlet or exhaust end of the motor 46 so as to force piston 46a and the piston rod 47 to the right and thereby retract the ram 10. The movement of the piston 46a forces hydraulic fluid from the motor 46 through line 45 to the valve 44 and into a return line 49 to the tank 38.

Shifting of the valve shaft 44a of the spool valve 44 to retract the ram 10 is automatically effected when the ram 10, in completing its forward or bacon feeding travel, engages a stop collar 50 on a valve shifting rod 51 which rotates a direction control valve 52 from the position shown in FIG. 20 to one in which pressure line 42 is directed through a line 53 to shift the spool valve shaft 44a from the position shown in FIG. 20 to the one in which the pressure in line 42a is directed to the line 48 to retract the ram piston 46a.

When fully retracted, the ram 10 engages a second stop collar 50a (FIG. 20) and shifts the rod 51 which returns the valve 52 to the position shown in FIG. 20 and thereby relieves the pressure in the line 53 so that the valve shaft 44a is biased by spring 54 to the position shown.

In addition, the valve shaft 44a may be manually shifted by a bell crank 55 to the ram retracting position from the ram advancing position shown in FIG. 20 to which it is biased by the spring 54. Moreover, the valve shaft 44a may be manually biased downwardly against spring 54a so that exhaust from the ram motor 46 is through line 48, the valve 44 and line 49 directly to the tank 38 and is substantially unthrottled thereby providing a fast forward speed for the ram 10 to bring the bacon slab B into slicing position. When not manually shifted by means of the bell crank 55, the valve shaft 44a is centered by the springs 54 and 54a in the central position shown in FIG. 20. When the valve 44 is supplying pressure fluid through line 45 to advance the ram piston 46a, and the valve shaft 44a is in the normal position shown in FIG. 20, the shaft 44a blocks line 48 and the discharge fluid from the motor 46 is directed through a line 48a to a controller, generally designated 56, which throttles and retards the rate of discharge of the hydraulic fluid from the motor 46 to the tank 38 and thereby regulates the speed of the ram 10 relative to the revolutions of the slicer blade 11 and consequently the thickness and weight of the bacon slices.

In order to effect fast return of the ram 10, the discharge of the hydraulic fluid from the controller 56 to the tank 38 preferably is blocked by closing a normally open solenoid-operated valve 57 which has a solenoid coil 58 that is energized to shift valve shaft 57a of the valve 57 and block the exhaust line 59 from the controller 56 to the tank 38 when the valve shaft 44a is shifted to the ram retracting position so that the full pressure in line 42 is directed through line 48 to retract the ram piston 46a and is not bled in part by the line 48a and the controller 56 through the valve 57 to the tank 38.

The solenoid 58 is energized by closing the normally open switch contacts 61a (FIG. 31) of a microswitch 61 (FIG. 20), the contacts 61a of which are closed when the microswitch arm 60 (FIG. 20) is engaged and actuated by upward movement of the valve shaft 44a. The solenoid coil 58 when energized forces the valve shaft 57a to the right (FIG. 20) against the compression spring 62 and closes the line 59. Thereafter, when the valve shaft 44a returns to the ram advancing position shown in FIG. 20, the switch actuating arm 60 is disengaged and the microswitch contacts 61a resume their position thereby deenergizing the coil 58 so that the valve spring 62 opens the valve 57 in the line 59.

The contacts 61a of the microswitch 61 also close to assure that coil 63 of the solenoid-actuated valve 41 is energized and the valve shaft 41a thereby forced to the right against spring 64 to the position shown in FIG. 20, whenever the valve shaft 44a is shifted to the ram-return position and engages the microswitch arm 60. Thus, whenever the valve shaft 44a is shifted so as to direct pressure fluid to the ram-return line 48, the valve supply line 42 always is supplied pressure fluid from the pump 35 by the valve 41.

More particularly, actuation of the microswitch arm 60 by the valve shaft 44a opens the normally closed switch 61b and closes the normally open contacts 61a (FIG. 31) which assures deenergization of a relay 66 and thereby assures that the normally closed relay contacts 66a are closed so that the solenoid coil 63 is energized through the closed contacts 61a of the microswitch 61 and the closed relay contacts 66a whenever the valve shaft 44a is in the ram-returning position.

When the valve shaft 44a is in the ram-advancing position, as shown in FIG. 20, the microswitch contacts 61a always are open so that the solenoid coil 63 is not energized therethrough. However, as shown in FIG. 31, a switch 67 is provided in series with normally open contacts 66b of the relay 66 with which to energize and deenergize the solenoid coil 63 of the valve 41 and thereby supply fluid through the line 42 to advance the ram feed 10 when the valve shaft 44a is in the ram-advancing position and even though the microswitch contacts 61a are open.

In accordance with the present invention, the bacon is sliced and shingled on the conveyor C in successive individual packaging assemblies, each having the same number of slices and which number can be regulably preselected. More particularly, the slicer blade 11 is rotated by the motor 26 at a constant speed while the bacon feeding ram 10 is alternately advanced and stopped in timed relation to the revolutions of the slicer blade 11 by opening and closing the switch 67 and thereby alternating the solenoid valve 41 between its ram-advancing and ram-stationary positions.

Slice count-control

FIGS. 21 to 24, inclusive, illustrate a counter-control mechanism, generally designated 13, which is operated by the slicer shaft 12 to operate the switch 67 intermittently. As there shown, the counter 13 includes a housing 69 which is secured as by bolts 70 to the guard housing 27. Rotatably journaled in anti-friction bearings 71 within the housing 69 is a shaft 72 adjustably secured by a set screw 73 to a coupling 74 secured by pin 75 and connector 76 to and in axial alignment for rotation with the slicer shaft 12.

Secured to the shaft 72 for rotation therewith is motion transmitting means comprising a worm gear 77 which as shown in FIGS. 21 and 22 drives a pinion gear 78 through adjustable idler gear mechanism 80. In the embodiment illustrated, the pinion 78 has sufficient teeth to complete one revolution for every 36 revolutions of the slicer shaft and the worm 77. One complete revolution of the pinion gear 78 constitutes a full cycle of the slicer during a portion of which, as for example during 16 revolutions of the slicer shaft, the ram 10 is stationary and no bacon is sliced while the conveyer C progresses and sufficient spacing develops between each group of twenty shingled slices so that there is no overlap of the successive groups or assemblies of shingled slices.

It will be understood that the total number of slicer blade revolutions to a cycle will be constant for a given pinion gear 78. However, it will be apparent that the number of revolutions in a cycle may be varied by substituting a pinion gear 78 having a greater or lesser number of teeth so that a greater or fewer number of revolutions of the slicer shaft 12 are required to complete a full revolution of the pinion 78.

In making the substitution, a locking nut 80a of the idler gear mechanism 80 is loosened and retightened after bell crank 80b has been pivotally adjusted about shaft 80c so that the idler gear 80d is relocated relative to the idler gear 80e and worm wheel 80f on the shaft 80c and accommodates a smaller or larger pinion in place of the pinion 78 on the shaft 79.

In accordance with the present invention, the portion of the cycle devoted to bacon cutting may be adjustably selected.

For this purpose, as shown in FIGS. 21–24, the motion transmitting means also includes a crank 81 which is secured by a set screw 81a to the shaft 79. The crank 81 includes an offset crank arm 82 and crosshead 83 which operatively engages a Scotch yoke 84 to reciprocate a face cam plate 85 through a forward and reverse stroke for each full revolution of the shaft 79 and crank 81.

As shown in FIG. 23, a cam follower 86 is pivotally secured to an adjustable support 87 and is adapted to open and close the limit or microswitch 67 as the cam 85 is moved through the forward and reverse strokes of a complete cycle. The lower portion of cam face 88 is cut away to provide a recessed face 89 so that during the portion of the cam cycle when the upper face 88 engages the follower 86, the normally open switch 67 is cammed closed, and during the remaining portion when the follower 86 engages the lower or recessed face 89, the switch 67 resumes the normal or open position which opens the circuit through the solenoid 63 (FIGS. 20 and 31) whereupon the spring 64 of the start and stop valve 41 forces the valve shaft 41a to the left so that advancement of the ram 10 is discontinued and the "no slice" portion of the cycle thereby initiated. Thereafter, when the cam 85 moves through that portion of its cycle in which the cam face 88 engages the follower 86 and closes the switch 67, the solenoid 63 is energized so that the valve 41 supplies pressure fluid to advance the ram 10 and bacon slicing is effected.

In order to vary the portion of the cam cycle in which the switch 67 is held in the closed or slicing position by the cam surface 88, the follower support 87 is adjustably mounted relative to the counter housing 69. More particularly, as shown in FIG. 23, the follower support 87 is supported in the housing 69 for slidable adjustment in the direction of movement of the cam 85. A spring 90 yieldably forces the support 87 downwardly and the thumb screw 15 engages and determines the position in which the support is held by the spring 90. A knurled nut 92 preferably is provided for locking the screw 91 and the support 87 in a desired position of adjustment.

In the embodiment illustrated, the support 87 is provided with rack teeth 93 which mesh with a gear 94 secured to shaft 95 (FIG. 24) and rotate the shaft 95 and the indicator dial 14 (FIG. 22) which is fastened thereon. The dial 14 preferably is graduated to indicate the number of slices of bacon which will be cut during a cycle for the selected position of adjustment of the cam follower support 87.

In accordance with the present invention, fine adjustment obtained with the thumb screw 15, for any selected number of slices to the cycle, serves to determine the angular position of the knife blade 11 at which advancement of the ram 10 is initiated and terminated so that only full and not partial slices are obtained at the beginning and end of each cycle as well as therebetween.

In order to check the "slice" and "no slice" setting of the counter 13, the slicer blade 11 may be turned by hand, noting at which position of the blade 11 that the switch 67 is initially closed by the cam face 88. From this point the total number of revolutions of the blade 11 that are required to open the switch 67 may be counted. This is the number of slices which will be produced per package. It is preferable to continue the counting until the switch 67 once more closes. The total count should be 36 in the illustrative example being considered and will serve as a check of count accuracy. If adjustment is needed, the lock nut 92 on the thumb screw 15 located on the outside of the counter box 69 may be loosened and the thumb screw 15 turned to get the proper count. Thereafter, the lock nut 92 may be tightened and the count checked before operating the machine.

In addition to providing means for adjustably selecting the number of cutting slices per cycle and assuring full first and last slices for each cycle, the present invention also assures that the first, as well as succeeding cycles, always starts to cut the full number of slices and that the full number is always cut unless ram travel is interrupted and slicing discontinued intentionally. Moreover, the invention provides that when slicing is restarted, the full number of slices will be cut unless slicing again is intentionally discontinued during the cycle and that slicing is never initiated part way through the cutting portion of the counter cycle.

Accordingly, as shown in FIG. 31, a relay 97 is provided which is energized whenever the counter-operated microswitch 67 is closed by engagement of cam face 88 (FIG. 23) with the cam follower 86. Energizing the relay 97 automatically opens the normally closed relay contacts 97a.

If the relay 66 is energized through the normally closed relay contacts 97a before the counter cam face 88 initially closes the counter switch 67, the energized relay 66 closes normally open relay contacts 66c in parallel with the relay contacts 97a and locks the relay 66 in the line, even though the closing of the switch 67 opens the relay contacts 97a. The energized relay 66 when thus locked in the line by the relay contacts 66c also holds closed the relay contacts 66b so that when the counter closes the counter switch 67 the solenoid 63 is energized through the counter switch 67 and the relay contacts 66b and pressure fluid is supplied through the valve 41 to advance the ram 10.

However, if, except for open relay contacts 66c and 97a, the circuit through the relay 66 is otherwise completed by closed switches at 61b, 99, 100 and 101, nevertheless the relay 66 cannot be energized while the counter switch 67 is closed and must wait until the counter switch 67 is opened and the relay 97 thereby deenergized so as to close the relay contacts 97a. Thereupon the relay 66 is energized through the contacts 97a and locked in by the closed contacts 66c of the energized relay 66 so that when the counter switch 67 is reclosed by engagement of the counter cam surface 88 with the cam follower 86 (FIG. 23), the solenoid 63 (FIG. 31) is energized through the switch 67 and contacts 66b and the valve 41 supplies pressure fluid to advance the ram 10 during the entire time the cam surface 88 and cam follower 86 are engaged, unless the relay 66 is sooner deenergized to open the contacts 66b.

Current to the relay 66 may be interrupted not only by opening the normally closed contacts 61b of the microswitch 61 (FIGS. 20 and 31) but also by depressing foot pedal 98 (FIG. 1) and thereby opening the normally closed switch 99 (FIG. 31); by opening the manual switch 100 on the machine (FIG. 1 and FIG. 31) or by the automatic opening of the normally closed switch 101 (FIGS. 4 and 31) by the paper board feeder F at the upper limit of its travel.

As shown in FIG. 1, the normally closed foot switch 99 is located under the slicer and is used by the operator to stop the slicing operation at any time. Opening the foot switch 99 deenergizes the relay 66 and opens the relay contacts 66c so that slicing cannot be restarted except at the beginning of a full count of slices for the setting of the counter. The manually operable switch 100 functions in the same manner.

*Slice thickness control*

In accordance with the present invention, the thickness controller 56 (FIG. 20) is adapted to control automatically the forward speed of the feed ram 10 and the consequent thickness of the bacon slices cut from the slab B by the blade 11. More particularly, the controller 56 is responsive to the weigher W and to the weight of each separate group or assembly of shingled slices of bacon conveyed to the weigher by the conveyor C and automatically compensates for departures in the weight of a group or package from a selected weight as, for example, a pound or half pound.

In addition, the automatic response and compensation of the controller 56 to and for weight variations is augmented and integrated with automatic response and compensation of the controller 56 to and for variations in size and shape of the bacon slab B adjacent the slicer blade 11.

In the illustrated embodiment, both compensations are effected by automatic adjustment of a reciprocable control device comprising a throttling valve 102 in the controller 56, responsive to weight and shape departures from preselected values. A control valve shaft 103 is raised or lowered responsive to changes in the weight and shape values, so that the effective size of the throttling orifice 104 formed by the overlapping portions of the orifice 105 in the hollow shaft 103, and the orifice 106 in the valve housing, is varied automatically so as to increase or decrease the resistance offered by the control valve 102 to the discharge of pressure fluid from the ram motor 46 and thereby increase or decrease the ram speed and consequently the thickness and weight of the bacon slices to compensate for under and over weight and size.

Located in parallel with and bypassing the valve 102 in the controller 56 is a manually adjustable valve 107 for regulating the discharge of fluid from the ram motor 46. Most of the discharge from the motor 46 is through the valve 107 which provides for coarse adjustment of the bacon slice thickness. The finer control of thickness is provided automatically by the valve 102.

In addition to the coarse adjustment valve 107 and the automatic fine adjustment, the controller 56 includes a compensating valve 108 through which the pressure fluid flows from the valve 41 directly to the valves 102 and 107, when the fluid is not supplied to the same two valves 102 and 107 from the motor 46 and the valve shaft 44a is in the lower or rapid traverse ram-advancing position. Preferably, the valve 108 is set to offer approximately the same resistance to the flow of fluid from the valve 41 as is offered to the flow of fluid from the motor 46 by the bacon slab load on the ram piston 46a. Thus, regardless of whether the valve 41 is in the "slice" or "no slice" position, the back pressure on the fluid from the valve 41 is always the same and there is no momentary build-up or drop when the valve shaft 41a is shifted so that ram speed and consequently slice thickness is not affected by the shifting of the valve shaft 41a and the resulting starting and stopping of the slicing operation.

As shown in FIG. 26, the valve shaft 103 preferably is spring loaded, as by spring 109, so as to urge the shaft 103 downwardly toward the open-most position of the variable valve orifice 104. An adjustable stop nut 110 may be provided for engaging the controller housing and determining the lowermost position of the valve shaft 103. As will be apparent, lowering the shaft 103 enlarges the variable valve orifice 104 and consequently decreases the resistance of the valve 102 on the escape of fluid from the ram motor 46 and thereby increases the speed of the ram 10 and the thickness and weight of the bacon slices.

*Responsive to shape*

As shown in FIGS. 26 and 27, there is adjustably secured by threads and lock nut 111 to the lower end of the valve shaft 103 a fork 112 which is pivotally secured by pin 113 to a lever 114 that is slotted at 115 and pivotally supported by a bolt 116 secured to an adjustable support 117. The support 117 is secured to the lower end of a jack screw 118 which may be raised and lowered by a jack nut 119 having a knurled handle 120 and a ratchet wheel 121 for turning the nut 119 and raising or lowering the pivot support 116 for the lever 114.

Also pivotally secured centrally to the lever 114 by a stud 122 is a whiffle-tree lever 123 to opposite ends of which additional whiffle-tree levers 124 and 125 are pivotally secured midway their ends by studs 126 and 127.

As shown in FIGS. 26 and 27, the four ends of the whiffle-tree 124 and 125 are pivotally connected to individual connecting rods 128 and which are pivotally connected at 129, as shown in FIGS. 25 and 26, to the rear ends of the individual gaging finger levers 16 to complete the motion transmitting means interconnecting the fingers 16 and the control valve 102.

Preferably, the connecting rods 128 between the ends of the whiffle-tree 124 and 125 and the individual gaging fingers 16 include a threaded adjustment and lock nut 131 for adjusting the length of the individual rods 128 and consequently the angular positions of the individual gaging finger levers 16 relative to their common pivot shaft 132 and the bacon slab B and table 21 (FIG. 25). The spring 109 (FIG. 26) acts through the valve shaft 103, lever 114 and whiffle-trees 123—124 and 125 to pull upward the connectors 128 and pivot the gauging feeler ends 133 of the individual levers 16 to the lowermost positions permitted by engagement of the stop 110 on the valve shaft 103 with the housing of the controller 56.

As is apparent from FIGS. 25 and 26, the shaft 132, on which the gaging finger levers 16 are pivotally mounted, is disposed transversely of the direction of travel of the bacon slab B to the slicer blade 11 so that the several feeler ends 133 engage the slab B at spaced points across its width.

As the slab B moves toward the blade 11, the finger feeler ends 133 follow the contour of the slab being raised by thicker portions and dropping to follow the contour of depressions in the slab therebeneath. The change in thickness of the slab at the several gaging points is integrated through the whiffle trees 123, 124 and 125 so that an increase in composite thickness raises the valve shaft 103 and thereby reduces the controller valve opening 104. Consequently, the resistance to discharge of pressure fluid from the motor 46 is increased and the speed of the ram 10 correspondingly decreased so that a thinner bacon slice of equal weight is cut from the thicker slab portion detected by the feelers 133. It will be apparent that lesser slab thicknesses and depressions will effect a lowering of the feelers 133 and a corresponding lowering of the valve shaft 103 with a resulting increase in slice thickness and maintenance of weight. Preferably the feelers 133 are located as close as possible to the blade 11 and shear plate 11a so that the setting of the valve shaft 103 effected by the feelers 133 of the gaging fingers 16 is responsive to the portion of the bacon slab at the slicer blade. Accordingly, the length of the finger levers 16 preferably are adjustable, as by a conventional slot and bolt arrangement generally shown at 134, so that the feelers 133 may be located adjacent the blade 11 for bacon slabs B of different thicknesses.

In addition to the gaging fingers 16, hold-down fingers H preferably are provided for holding the slab B on the table 21 during slicing. The hold-down members H, as shown in FIG. 25, are pivoted on a shaft H' and are spring biased so that the tips of the fingers press firmly against the slab. The fingers H may be located between the gaging fingers 16 or otherwise spaced transversely of the table 21 and slab B as may be necessary to prevent the knife blade 11 from picking the slab up from the table, as shown in FIG. 26.

*Responsive to weight*

In accordance with the present invention, the slab feed and slice thickness controller 56 also is responsive to the weigher W (FIG. 1) and to the weight of the shingled slices of bacon supplied thereto on paper boards by the conveyor C.

Conventional weighing equipment may be used. However, a weighing unit, such as that illustrated and described in a copending application, Serial No. 390,511, filed Nov. 6, 1953, which become Patent No. 2,938,626 on May 31, 1960, is particularly suitable because of its accuracy and rapid sensitivity in high speed use.

The adjustment of the controller valve shaft 103 responsive to the weigher W is effected by turning the jack nut 119 (FIG. 26) to raise or lower the pivot pin 116 on which the lever 114 is pivotally mounted.

More particularly, as shown in FIGS. 28 and 31, the means operatively associated with the weigher for operating the control valve includes a pair of solenoids 135 and 136 which are provided for rotating the ratchet wheel 121 responsive to the weigher W. In the illustrated embodiment, the armatures 135a and 136a of the solenoids are aligned and rigidly connected by members 137 and 138 to opposite ends of a slide or shift bar 139 which is slidably mounted in fixed bearings 140. Centrally secured to bar 139 is a pin 141 which is located between a pair of levers 142 and 143 which are pivotally secured on a bushing 144 (FIG. 26) about a hub portion of the jack nut 119. The levers 142 and 143 are spring biased by springs 145 into engagement with the pin 141 and a fixed stop pin 148. Pivotally secured to each of the levers 142 and 143 by pins 147 are ratchet pawls 142a and 143a which are biased by a spring 146 into engagement with the fixed stop pin 148.

As shown in FIG. 31, the solenoid 135 is energized through a switch 150 which is normally open and which is closed by the weigher W when the weigher registers in a selected under-weight range. Similarly, the solenoid 136 is energized through a switch 151 which is normally open and which is closed by the weigher when the weigher registers in a selected over-weight range. The solenoids 135 and 136 also are disposed in series with a normally open microswitch 152 (FIGS. 1 and 31) which is closed only momentarily when engaged and actuated by a bacon package. Thus the solenoids 135 and 136 can only be energized after the bacon package has been on the weigher W long enough to reach equilibrium and correction of the controller 56 is not effected by faulty or premature weight readings.

The solenoids 135 and 136 and their respective switches 150 and 151 may be set to correct and compensate the slice thickness controller 56 in any desired amount for any selected under and over weight or weight range and the weight may be expressed by the weight indicators 153 (FIG. 1) in any units desired.

In a preferred embodiment, under and over weight is expressed in whole bacon slices and third and two-third fractions thereof and the switches 150 and 151 for respectively energizing the correcting solenoids 135 and 136 are closed when the weigher indicators 153 register any weight variation of between one and two slices.

Generally in the case of bacon, the slabs B vary too greatly in shape for departures of less than one slice per package from a selected weight to be significant because the bacon being weighed was cut from a portion of the slab substantially removed from the portion about to be sliced and for which the correction would be effective.

For products of uniform shape and density, the feed control regulator 56 may be made responsive to very slight departures from a selected weight.

The control may also be made responsive to greater departures. However, it generally will be found desirable to ignore large departures as being non-recurring and of a nature which makes preferable no correction of the feed controller 56.

In the illustrative embodiment, the correction of the feed control 56 is by equal increments each time a critical weight departure is detected and regardless of differences in the amount of under or over weight. However, it will be appreciated that the corrective adjustment may be proportional to the amount of under or over weight. In such an adaptation, the pin 116 (FIG. 26) would be raised or lowered an amount corresponding to the amount which the package of sliced bacon is under or over weight.

In the illustrated embodiment, the pin 116 is raised or lowered the same amount each time an under or over weight package is detected in the selected weight range.

More particularly, for example, if an under weight package is detected in the selected range of one to two slices, the solenoid 135 is energized by the switches 150 and 152 and shifts the armature 135a and shift bar 139 to the right (FIG. 28) causing the pin 141 to pivot the lever 142 counterclockwise about the screw 118. Concurrently, the spring 146 biases the pawl 142a into engagement with the ratchet wheel 121 which, with the jack nut 119, is rotated counterclockwise so as to lower the jack screw 118, thereby lowering the valve shaft 103 and thus increasing the size of the valve orifice 104 so that the speed of the ram 10 is increased and the thickness of the bacon slices increased to correct for the underweight package detected by the weigher W.

During the corrective action of the lever 142, the lever 143 and ratchet pawl 143a are restrained in the positions shown in FIG. 28 by the stop pin 148. When the solenoid 135 is deenergized by the switch 152, springs 145 and 146 return the lever 142 and the pawl 142a to the positions shown in FIG. 28.

The same correcting operation and in the same amount is repeated for under weight every time the switches 150 and 152 are concurrently closed and a similar operation is effected to correct for over weight by the solenoid 136 and lever 143 every time the weigher W indicates over weight in the selected range and switches 151 and 152 are closed.

*Conveyor*

Successive bacon slices fall from the slicer blade 11 and land on a receiving roller 154 of the conveyor C at regularly spaced intervals and in "lapped" or "shingled" relation corresponding to the cutting revolutions of the blade 11 as determined by the setting of the dial 14 of the counter 13 and to the speed of rotation of the receiving roller 154.

As shown in FIG. 2, the roller 154 is located transversely of the slicer with the fixed shaft 155, on which the roller 154 is freely rotatable, parallel with the slicer blade 11. The right ends of the roller 154 and shaft 155 (as viewed from the weigher W facing longitudinally of the machine toward the slicer S) preferably are somewhat lower than the left ends so that the bacon slices, which are separated and fall away from the right side of the slab before the left, fall generally parallel to and strike the roller 154 simultaneously throughout the length of each slice.

It also has been found desirable to provide the roller 154 with radially projecting sharply pointed spikes or needles 156 which are located in spaced rows and at equal intervals about the periphery of the roller. The needles 156 prevent the bacon slices from skidding when they strike the roller 154, and also prevent the slices from sliding or bouncing back from the roller and being wiped off by the slicer blade.

The receiving roller 154 also serves as a pulley or guide for the laterally spaced endless belts or conveyor strands 157 of the conveyor C.

Figure 5:
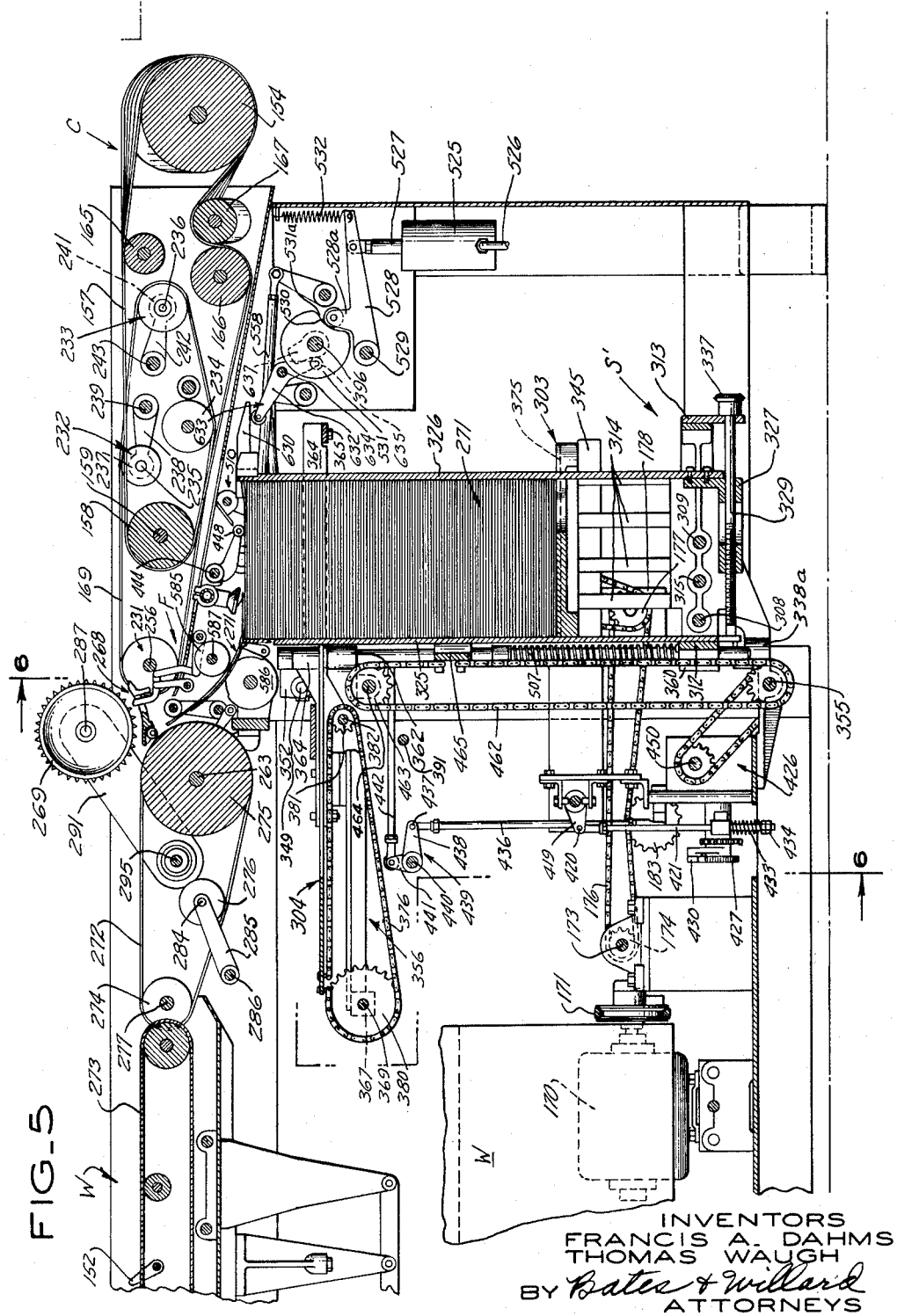
FIG. 5 is a cross-section view taken on line 5—5 of FIG. 2.

The conveyor strands or ribbons 157 travel over individual pulleys 158 suitably spaced and secured on a driven shaft 159, the pulleys 158 serving to directly drive the conveyor strands 157 and indirectly to drive the receiving roller 154. As shown in FIG. 2, the shaft 159 is journaled in suitable bearings 160 and 161, respectively, carried by inner side plates 188 and 189 of the housing which is generally designated 190. As shown in FIG. 5, additional idler pulley rollers 165, 166 and 167 are provided for the belts 157. The roller 165 restrains the belts 157 in horizontal alignment adjacent the receiving roller 154 and the roller 167 is canted or inclined relative to the horizontal an equal and opposite amount from, and so as to compensate for the roller 154.

As shown in FIGS. 2 and 3, secured to one end of the shaft 159 is a gear 168 with which, in accordance with a preferred embodiment of the present invention, the conveyor ribbons 157 are driven at two different speeds.

More particularly, the conveyor ribbons 157 and roller 154 are driven at a first speed when the bacon is being sliced, and they are driven at a second speed when the bacon is being transferred from the ribbons 157 to a second set of interspaced conveyor ribbons 169. Preferably the first speed is somewhat slower than the second and is selected and coordinated with the speed of the slicer knife 11 so as to expose a desired amount of each slice of overlapping or "shingled" bacon slices to the "weather." When the number of slices for which the counter 13 is set has been cut and deposited on the roller 154, the speed of the conveyor ribbons 157 is increased during the "no-slice" portion of the operation of the counter 13 so that the spacing between each group or package of bacon slices is greater than would result if the conveyor movement remained at the slower speed required for properly spaced overlap of the slices.

*Conveyor drive*

Figure 4:
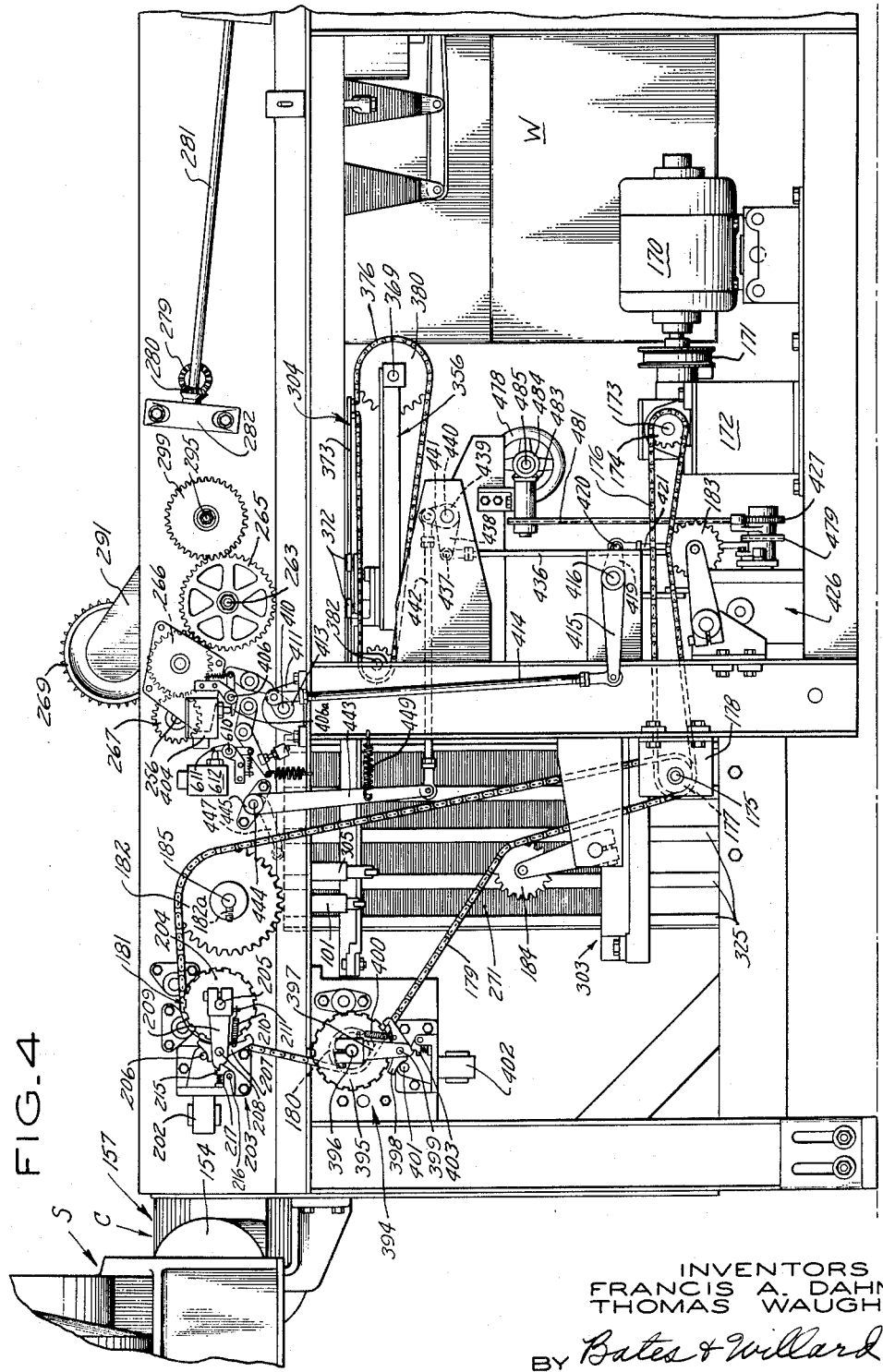
FIG. 4 is a rear elevation view of the central portion of the machine as seen from the top of FIG. 2.

The drive for the conveyor C is from an electric motor 170 through a Reeves variable speed belt and pulley drive 171 and a speed reducer 172, to drive shaft 173 to which is secured a sprocket 174 which, as shown in FIG. 4, drives an idler shaft 175 through a chain 176 and a double sprocket 177 secured to the idler shaft 175 which is rotatably journaled at its ends in bearing brackets 178.

The double sprocket 177 drives a chain 179 which is trained about sprockets 180, 181 and 182. Preferably, both of the drive chains 176 and 179 are provided, as shown in FIG. 4, with tensioning idlers 183 and 184, respectively, with which proper tension may be established in each of the chains.

The sprocket 182 is secured to an idler shaft 185 which is rotatably journaled in bearings 186 and 187 mounted on side plates 188 and 189 of the housing frame which is generally designated 190.

As shown in FIGS. 2, 3 and 17, the drive from the shaft 185 to the drive gear 168 on the conveyor drive shaft 159 is through a planetary gear assembly, which is generally designated 191, and the details of which are shown more particularly in FIGS. 17–19.

The planetary gear assembly 191 includes the sun gear 192 which is secured by a key 193 to the shaft 185 and meshes with three planetary gears 194 which are rotatably secured on three individual stud shafts 195 and which mesh with and rotate an internal gear ring 196 which has an external gear 197 which meshes with and drives the drive gear 168 on the conveyor shaft 159.

As shown in FIGS. 17 and 18, each of the stud shafts 195 is secured by a nut 198 to an individual arm 199 of a three-arm spider 200 which is rotatably journaled on the shaft 185.

During the slicing operation, the drive to the conveyor drive shaft 159 is a a constant speed with the spider 200 secured against movement so that the lapping of the bacon slices is uniform for the entire package.

*Two-speed conveyor mechanism*

In accordance with a preferred embodiment of the invention, immediately following completion of the slicing of a preselected number of bacon slices onto the roller 154, the speed of the roller 154 and conveyor ribbons 157 is increased to that of the faster conveyor ribbons 169 so that transfer of the package of shingled slices thereto is made when the speed of the ribbons 157 and 169 are substantially synchronized. The speed-up of the conveyor ribbons 157 is achieved by effecting and adding rotary movement of the spider 200 to the rotation of the sun gear 192 in the planetary drive 191.

More particularly, the opening of the counter switch 67 (FIG. 31), following cutting of the preselected number of bacon slices by the knife 11, deenergizes the relay 97, thereby closing the normally closed relay contacts 97b and energizing a solenoid 202 through normally closed relay contacts 201a of a relay 201.

Referring to FIG. 4, the solenoid 202 is associated with a one-revolution clutch mechanism which is generally designated 203 and which includes a ratchet wheel 204 secured to and rotated with the sprocket 181 on shaft 205. The energization of the clutch solenoid 202 responsive to the opening of the switch 67 by the slicecounter 13 (FIG. 23) acts through linkage 206a to retract a pin 206 (FIGS. 2 and 4) out of engagement with a pawl 207 which is pivotally secured by a pivot pin 208 to a crank arm 209 fastened to the shaft 205. Retraction of the pin 206 permits a tension spring 210, one end of which is secured to lug 211 on the crank arm 209, and the other end of which is secured to the pawl 207, to pivot the pawl counterclockwise (FIG. 4) and to engage the end of the pawl with the rotating ratchet wheel 204 thereby clutching the arm 209 to the ratchet wheel 204 for rotation therewith. Initial rotation of the shaft 205 causes a cam 213a to close a microswitch 213 (FIGS. 3 and 31) which energizes the relay 201 and thereby opens the relay contacts 201a to deenergize the clutch solenoid 202 whereupon a spring 214 (FIG. 2) advances the clutch pin 206 into the path of travel of the pawl 207. Concurrently, the energized relay 201 closes the relay contacts 201b and locks in the relay 201 through the relay contacts 97b so that the pin-retracting solenoid 202 cannot reenergized until after the counter-switch 67 has been closed and subsequently reopened following the cutting of the succeeding group of bacon slices. As is apparent from FIG. 31, the closing of the counterswitch 67 energizes the relay 97 and opens the relay contacts 97b thereby deenergizing the relay 201 which recloses the contacts 201a and reopens the contacts 201b preparatory to reenergization of the clutch solenoid 202 when the full count of slices have been cut and the relay contacts 97b close with the opening of the counter-switch 67.

With the completion of one revolution of the shaft 205, the pawl 207 is engaged and cammed clockwise (FIG. 4) by the pin 206 thereby disengaging the pawl 207 from the ratchet wheel 204 and declutching the shaft 205 from the constantly rotating sprocket 181 and ratchet wheel 204.

Preferably the one-revolution clutch 203 includes an anti-backlash pawl 215 which is pivoted at 216 and yieldably urged by a spring 217 into the path of the crank arm 209 so as to engage and permit clockwise rotation of the crank 209 while preventing counterclockwise backlash movement thereof.

The one revolution of the shaft 205 serves to rotate the spider 200 in the planetary gear assembly 191 and thereby effects an increase in the speed of the conveyor drive shaft 159 over the constant speed imparted thereto by the sprocket 182.

More particularly, as shown in FIGS. 2 and 3, there is secured to the shaft 205 a crank 218 to the end of which is pivotally secured an end of an adjustable connecting rod 219, the other end of which is pivotally secured by a pin 220 (FIG. 19) to an end of a lever 221 which is rotatably mounted on the shaft 185 (see FIG. 19). One revolution of the crank 218 effects a single oscillation of the lever 221 on one end of which is pivotally mounted a pawl 222 which is yieldably urged counterclockwise (FIG. 19) into engagement with a ratchet wheel 223 by a spring 224 which is fastened to a pin 225 on the pawl 222 and to a pin 226 on the lever 221. The ratchet wheel 223 is keyed at 223a to the spider 200 so that counterclockwise movement (FIG. 19) of the lever 221 effects the same counterclockwise movement of the ratchet wheel 223 and the spider 200. The pawl 222 rides over the ratchet wheel 223 during the clockwise portion of the oscillation of the lever 221 in completing a single revolution of the crank 218 (FIG. 3) and shaft 205. Clockwise rotation (FIG. 19) of the ratchet wheel 223 is prevented by a spring-biased pawl 227 that is pivotally secured by pin 228 to frame plate 229 of the planetary gear assembly 191 which is secured by corner bolts 230 to the frame side plate 189.

It is apparent from FIGS. 18 and 19 that the angular movement of spider 200, responsive to the single oscillation of the lever 221, is added by the planetary gearing to the drive from the sun gear 192, and thereby increases the speed of the conveyor drive gear 168 on the conveyor shaft 159.

Preferably the increase in speed is sufficient to synchronize the speed of the conveyor ribbons 157 with that of the constant high speed conveyor ribbons 169 during the transfer of the bacon slices therebetween.

*Conveyor transfer*

As shown in FIG. 5, the conveyor ribbons 169 to which successive groups of bacon slices are transferred from the conveyor ribbons 157 are trained over a series of individual pulleys 231, 232, 233 and 234 and are located, as shown in FIG. 2, partially coextensive with and interspaced among the ribbons 157.

Preferably the guide pulleys 232 and 233 are movable between the positions shown in FIGS. 12 and 14 to facilitate the transfer of each group of bacon slices from the conveyor ribbons 157 to the conveyor ribbons 169.

More particularly, the individual pulleys 232, as well as the pulleys 233, are spaced to receive therebetween, without engaging, the ribbons 157 when the pulleys 232 and 233 raise the ribbons 169 above the ribbons 157. As shown in FIGS. 2 and 5, the spaced pulleys 232 are secured on a shaft 235 and the spaced pulleys 233 are secured on a shaft 236. The shaft 235 is rotatably journaled in bearings 237 at the outer ends of a pair of crank arms 238 which are secured to a shaft 239 that is horizontally disposed and extends through the frame side plates 188 and 189 and is rotatably journaled in bearings 240 secured to the side plates. The shaft 236, to which the ribbon guide pulleys 233 are secured, is similarly journaled in bearings 241 at the end of crank arms 242 which are secured to a shaft 243 journaled in bearings 244 secured to the side plates 188 and 189.

As shown in FIGS. 2 and 3, there is secured to the shaft 239 a crank arm 245 on the outer end of which is a stud 246 on which a cam follower roller 247 is rotatably secured. The roller 247 rests on a cam 248 which is secured to the one-revolution shaft 205. A similar crank arm 249 is secured to the shaft 243 and is provided at its outer end with a stud 250 on which is rotatably secured a cam follower roller 251 that rests on a cam 252 secured to the same one-revolution shaft 205.

The cams 248 and 252 are shaped so that while the guide pulleys 232 and 233 are in the positions shown in FIGS. 11 and 12, the leading edge 253 of the third group of overlapping bacon slices III approaches the line of intersection 254 of the ribbons 157 and 169. The cam 248 thereupon swings the crank 245 so as to rotate the shaft 239 and pivot the pulleys 232 down to the position shown in FIG. 13 where the conveyor ribbons 169 are entirely beneath the ribbons 157 on which the group of bacon slices III approach the roller pulleys 158. As the trailing edge of group III reaches the ribbons 169 the cam 252 swings the crank 249 so as to rotate the shaft 243 and move the pulleys 233 to the position shown in FIG. 14, in which the pulleys 233 raise the high speed ribbons 169 above, and lift the group III of overlapping bacon slices from the ribbons 157.

Concurrently with the transfer of the bacon package to the conveyor ribbons 169, the speed of the ribbons 157 is accelerated and attains the speed of the constant-speed ribbons 169 so that the transfer is effected without crowding or separating the bacon slices in the group.

Thereafter, the cam 248 pivots the crank 245 and the shaft 239 clockwise (FIG. 3) so as to raise the pulleys 232 to the positions shown in FIG. 9 in which the high speed ribbons 169 support the bacon group out of contact with the ribbons 157 and the latter thereupon slow down to the slower of their two speeds to receive a further group of bacon slices from the slicer.

With the slowing of the ribbons 157, the faster speed of the conveyor ribbons 169 acts to further separate the spacing between the groups of bacon slices on the ribbons 169 and those on the ribbons 157.

Substantially concurrently as shown in FIG. 10, the pulleys 233 are swung downward so as to lower the high speed ribbons 169 below the slower moving ribbons 157 and the on-coming group of bacon slices III thereon.

Referring generally to the conveyor drive, the conveyor ribbons 169 are driven by the individual pulleys 231 which are secured to a drive shaft 256 journaled in bearings 257 that are secured to the frame side plates 188 and 189 and the shaft 256 is driven by the motor 170 through the speed changer 172.

More particularly as shown in FIG. 3, a sprocket 258 secured to the shaft 173 of the speed changer 172 drives an endless chain 259 which is trained over sprockets 260 and 261 and over a take-up sprocket 262 with which slack is removed from the chain in conventional manner.

The sprocket 261 is secured to a shaft 263 which is journaled in bearings 264 (FIG. 2) that are secured to the side plates 188 and 189.

As shown in FIGS. 2 and 4, secured to the shaft 263 is a gear 265 that meshes with and drives an idler gear 266 which in turn meshes with and drives a gear 267 that is secured to the drive shaft 256 for the conveyor ribbon 169.

As is apparent from FIGS. 12–14, each group of overlapping bacon slices is delivered by the conveyor ribbons 169 to a concave shoe member 268 having transversely spaced longitudinal ribs or tracks 268a (FIG. 2) over which each group of bacon slices is transferred by spiked wheels 269 and delivered to knurled paper-feed rollers 270 which are transversely spaced on and secured to the driven shaft 263.

As shown in FIG. 14, each paper board 271 is fed upwardly over the knurled rollers 270 to receive a group of bacon slices and the assembled bacon and paper board conveyed from the rollers 270 and transferred by conveyor ribbons 272 to the conveyor ribbons 273 (FIGS. 1, 2 and 5) of the weighing balance W.

As shown in FIGS. 2 and 5, the ribbons 272 are trained over individual pulleys 274 and 275 and are provided with take-up pulleys 276 for removing slack from the ribbons.

More particularly, the rollers 274 are secured to a drive shaft 277 which, as shown in FIG. 2, is journaled in bearings 278 on the side plates 188 and 189. As shown in FIGS. 2 and 3, the sprocket 260 which is driven by the chain 259 is secured to the shaft 277 and drives the ribbons 272 at the same speed as the ribbons 169 and 273.

Referring to FIG. 2, a bevel gear 279 is secured to the shaft 277 and drives a bevel gear 280 which is secured to a drive shaft 281, one end of which is journaled in a pillow block 282 secured to the frame plate 188 and the other end of which drives the drive shaft (not shown) of the conveyor ribbons 283 (FIG. 1) to which the bacon packages are transferred from the weigher conveying ribbons 273 for such weight alteration by the operator as may be necessary to bring the package to correct weight.

The conveyor ribbons 283 preferably travel at the same speed as the conveyor ribbons 272 and the conveyor ribbons 273 of the weigher W. The construction and operation of the latter may vary greatly. An example of a weigher which has been found extremely satisfactory is illustrated and described in copending application, Serial No. 390,511, filed Nov. 6, 1953, by Francis A. Dahms.

Referring to FIGS. 2 and 5, the takeup pulleys 276 for the ribbon 272 are rotatably journaled on a shaft 284 the ends of which are secured to individual arms 285 that are pivotally carried by a shaft 286 secured to the side plates 188 and 189. It will be apparent that with the illustrated arrangement, the pulleys 276 bear with the force of gravity on the ribbons 272 and eliminate slack. As shown in FIGS. 2 and 5, the guide pulleys 275 over which the ribbons 272 are trained are suitably spaced and are rotatably journaled on the shaft 263.

The spiked wheels 269 shown in FIGS. 1–5 and 14.

with which the bacon slices are transferred from the conveyor ribbons 169 over the ribbed concave shoe member 268 and onto a paper board 271 on the knurled rollers 270 and conveyor ribbons 272, are shown in greater detail in FIG. 15. As there shown, each spiked wheel 269 is secured by a set screw 286 to an inner end of an individual shaft 287. Each shaft 287 is journaled in individual bearing bushings 288 and 289 within a tubular support 290 projecting rrom a hollow arm 291. As shown in FIG. 15, the two wheels 269, 269 are spaced from each other and their shafts 287 are generally aligned with each other in horizontal positions. The two arms 291, 291 are pivotally supported for movement in spaced vertical planes and each is provided with a hub portion 292 containing bushings 293 and 294 which are freely rotatable on a shaft 295 journaled in bearings 296 secured to the side plates 188 and 189. Individual springs 297 tensioned between each of the arms 291 and the adjacent side plates (188, 189) counterbalance the arms 291 so that the wheels 269, 269 press uniformly against bacon on the shoe member 268.

Preferably, however, the arms 291 engage adjustable stops (not shown) which prevent the wheels 269 from engaging the shoe member 268.

The two spiked wheels 269, 269 are driven by the shaft 295. Referring more particularly to the drive for the wheels 269, as shown in FIG. 4, the gear 265 meshes with and drives a gear 299 which is secured to the shaft 295 on which, as shown in FIG. 15, there is secured within each hollow arm 291 a sprocket 300 which through a chain 301 drives a sprocket 302 secured to the wheel shaft 287.

The magazine for storing the paper boards 271 and the mechanism for adjusting and feeding the paper boards to the knurled wheels 270 and for synchronizing the delivery of a paper board 271 to each group of bacon slices on the knurled wheels 270 by the spiked wheels 269 is hereinafter described.

*Magazine for paper board feed*

Referring to FIG. 4, there is a lower or principal feed table 303 and an upper or secondary feed table 304 in the magazine feed unit F for the paper boards 271. Generally, the lower feed table 303 feeds paper boards 271 upward toward the bacon line until the table 303 trips a microswitch 305 (FIGS. 4 and 31) and lights a signal light 306 (FIGS. 1 and 31), indicating the need for shifting the paper board feed to the upper table 304 and reloading the lower feed table 303 with paper boards. If the shift is not made, the table 303 continues to be fed upward until the table engages and opens the switch 101 (FIGS. 4 and 31) and thereby stops further table feed until the table 303 is lowered and the switch 101 reclosed.

In making the shift, the second or upper feed table 304, called the "comb," is fed inward between the lower feed table 303 and the paper boards 271 by turning hand wheel 307 (FIGS. 1-3), whereupon the table 304 is automatically fed upwardly and thereby feeds the stack of paper boards 271 upward while the table 303 may be lowered and reloaded with a new supply.

Referring more particularly to the construction and operation of the paper board magazine feeding mechanism, a pair of spaced horizontal bed rods 308 and 309 (FIGS. 7 and 8) extend transversely of the frame and are secured at their ends to the side plates 188 and 189. Slidably supported on the rods 308 and 309, as shown in FIGS. 7 and 8, are a pair of castings 310 and 311 to the ends of which are fastened crossbars 312 and 313 which extend transversely of the machine and form with the castings 310 and 311 a slidably mounted rectangular frame support, generally designated S', for the lower and upper tables 303 and 304.

As shown in FIGS. 7 and 8, there are secured to the casting 311 a series of spaced vertical guide bars 314 which provide a guide wall parallel to the side plate 188. The distance of the guide bars 314 from the side plate 188 and the position of a stack of paper boards aligned thereagainst is transversely adjustable relative to the line of travel of bacon on the conveyor ribbons 157, 169, 272, so that the paper board edge engaged by the guide bars 314 may be aligned in proper relation to the line of bacon slice ends nearest the side wall 188 of the machine.

The transverse adjustment is effected with a feed screw 315, one end of which thread-engages the casting 311 and the other end of which is rotatably journaled in a bearing 316 secured to the side plate 189. Rotation of the screw 315 to advance and retract the frame support S' is effected with the hand wheel 18 through a chain and sprocket drive which, as shown in FIGS. 7 and 8, includes a sprocket 318 secured to hand wheel shaft 319, chain 320, a double idler sprocket 321 on idler shaft 322, a chain 323, and a sprocket 324 secured to the feed screw 315.

As shown in FIG. 5, the front edges of the stacked paper boards 271 engage and are aligned by vertical guide bars 325 which are transversely spaced and secured on the cross bar 312 of the adjustable magazine frame support S'. In the illustrated embodiment, mechanism is provided for pressing the stack of paper boards 271 firmly against the aligning wall of guide bars 325.

More particularly, the mechanism includes a plurality of vertically disposed push bars 326 the bottoms of which are secured at spaced intervals to a slide plate 327 which is slidably mounted on guide rods 328, the ends of which, as shown in FIGS. 7 and 8, are secured to the cross members 312 and 313 of the frame support S'. The slide 327 with its push bars 326 may be retracted and advanced so as to accommodate paper boards of different sizes and, if desired, to press a stack of paper boards 271 against the alignment bars 325. Advancement and retraction of the slide 327 is accomplished by means of a feed screw 329 which is rotatably journaled in the crossmembers 312 and 313 and extends through and threadengages the slide plate 327. Rotation of the screw 329 to advance and retract the slide plate 327 and bars 326 is effected with the hand wheel 17 which is secured to a shaft 331 journaled in a bearing 332 extending through the frame side plate 189. Secured to the inner end of the shaft 331 is a coupling 333 which is slidably keyed to a shaft 334 that is rotatably journaled in brackets 335. The brackets are fixed to the cross member 313 of the frame support S' and hold bevel gear 336 which is pinned to the shaft 334 in driving engagement with a bevel gear 337 which is secured to the feed screw shaft 329.

In accordance with the present invention, the magazine table 303 which supports and feeds the paper boards 271 upwardly is carried by and moves with the frame support S' to any selected position of lateral adjustment.

More particularly, a pair of brackets 338 and 339 are secured to the castings 310 and 311 as by machine screws 340 and, as shown in FIGS. 6, 7 and 8, the brackets include hubs 338a and 339a, respectively, in which are secured the lower ends of spaced vertical rods 342 and 343. Slidably supported on the rods 342 and 343 are the hubs 344a and 345a of a pair of brackets 344 and 345, respectively, on which the table 303 is secured by bolts 341.

The raising and lowering of the table 303 is effected through drive chains 346 and 347, the ends of each of which are secured (as shown in FIGS. 6 and 8) to opposite ends of a horizontal cross bar 348 that is fastened to the table brackets 344 and 345. The chains 346 and 347 are trained respectively over idler sprockets 349 and 350 that are rotatably mounted on horizontal stub shafts which are secured to brackets 351 and 352 that are respectively fastened to the tops of the guide rods 342 and 343.

The chains 346 and 347 respectively engage and are driven by sprockets 353 and 354 which are secured to the ends of a common drive shaft 355.

Upper magazine table

The upper magazine table 304 also is operably carried by the laterally adjustable frame support S'. More particularly, the upper table 304 includes a vertically movable frame, generally designated 356, and having a pair of vertical slide rods 357 and 358 which are slidably journaled at their lower ends in bearing blocks 359 and 360 (FIGS. 5 and 8) secured to the cross bar 312 of the support S'. As shown in FIGS. 5 and 6, the slide rods 357 and 358 are slidably journaled adjacent their upper ends in hub bearing portions 361 and 362, respectively, of the brackets 351 and 352. Secured to the upper ends of the slide rods 357 and 358, as shown in FIGS. 6-8, are a pair of castings 363 and 364 which are components of the frame 356 of the upper table 304. The forward ends of the castings 363 and 364 are connected by a horizontal cross bar 365 and secured to the rear ends are bearing brackets 367 and 368 in which a horizontal shaft 369 is rotatably secured.

Secured to the castings 363 and 364 is a cross-bar 370 (FIGS. 6 and 7) on which is secured suitable slide bearings, including gib plates 371 and rollers 372, with which a comb-shaped plate 373 is slidably mounted for movement between the position shown in FIGS. 5, 7 and 8 in which the comb fingers 374 lie outside the stack of paper boards 271 and a forward position in which, when the lower table 303 is raised, the fingers 374 extend into slots 375 in the table 303 beneath the bottom of the stack of paper boards and with the tips of the fingers 374 resting on the cross-bar 365 so that the comb plate 373 can support and raise the paper board stack from the table 303 and continue the feeding of paper boards upwardly without interruption while the table 303 is lowered and a new stack of paper boards placed thereon.

The comb plate 373 is advanced and retracted manually by means of a chain drive 376 and the hand wheel 307. More particularly, as shown in FIGS. 5-8, the chain chain 376 is secured at its ends of bolts 378 and 379 to the rear of the comb plate 373 and is trained over a sprocket 380 which is secured to the shaft 369, and over a sprocket 381 which is secured to a shaft 382, the ends of which are rotatably journaled in suitable bearings in the castings 363 and 364, respectively.

The drive for advancing and retracting the forked-plate 373 preferably includes a scissors or shear-arm type chain arrangement, generally designated 383, between the hand wheel 307 and the shaft 382 so that the drive connection from the hand wheel 307 to the shaft 382 is maintained and operative while the table 304 is being raised and lowered, regardless of the elevation at which the table is located, and without being affected by the raising and lowering of the table.

More particularly, the chain drive generally designated 383 includes a chain 384 and a chain 385. As shown in FIG. 8, the chain 384 is trained over a sprocket 386 that is secured to the shaft 382 and over a sprocket 387 which is secured to a shaft 388, the ends of which are rotatably journaled by an arm 389 that is pivotally secured to the shaft 382. The shaft 388 also is pivotally secured by an arm 390 to a shaft 391 which is rotatably journaled in bearings secured to the side frame members 188 and 189 and to which the hand wheel 307 is secured.

As shown in FIGS. 7 and 8, the chain 385 is trained over a sprocket 392 which is secured to the shaft 391 and over a sprocket 393 which is secured to the shaft 388.

Referring more particularly to FIG. 8, clockwise rotation of the sprocket 392 by means of the hand wheel 307 (FIG. 7) serves to advance the comb plate 373 so that the ends of the spaced fingers 374 move to positions above the cross bar 365 which provides support for the fingers when the weight and upward feed of the stack paper boards 271 transferred to the comb plate 373 from the lower table 303. In effecting the transfer, the comb 373 is advanced by means of the hand wheel 307 while the fingers 374 are aligned with, so as to be received within grooves 375 (FIG. 6) in the lower table 303 when the latter has been raised into alignment.

Automatic elevator

In accordance with the invention, the table 303 is automatically and progressively raised so as to position the top paper board 271 at a selected elevation suitable for feeding of successive paper boards from the top of stack in the magazine to each of successive groups of bacon slices on the conveyor C.

Moreover, the invention further provides for continuing the automatic upward feed on the comb 373 of the upper table 304 when the stack is transferred to and supported thereon.

In the preferred embodiment illustrated, a common drive is used to raise selectively the two tables 303 and 304.

Referring to FIG. 4, the drive for raising the stack of paper boards 271 includes a one-revolution clutch, generally designated 394, which in the illustrated embodiment is identical with the one revolution clutch 203 heretofore described.

The clutch 394 includes a ratchet wheel 395 which is secured to and rotatable with the continually driven sprocket 180 on shaft 396. Secured to the shaft 396 is clutch arm 397, the outer end of which pivotally carries ratchet pawl 398 on a pin 399. As shown in FIG. 4, ratchet pawl 398 is biased by a spring 400 toward engagement with the ratchet wheel 395 and is releasably latched out of engagement by a latch pin 401.

A solenoid 402 is provided which when energized retracts the latch pin 401 out of engagement with the pawl 398. Thereupon the pawl 398 is spring pressed into engagement with the ratchet wheel 395 which rotates the shaft 396 through one revolution at the completion of which, if the solenoid 402 has been deenergized, the pawl 398 engages the latch pin 401 and is thereby cammed out of its clutching engagement with the ratchet wheel 395. If the solenoid 402 remains energized, the latch pin 401 remains retracted and the arm 397 and drive shaft 396 for raising the paper board magazine tables 303 and 304 is rotated through another revolution. As shown in FIG. 4, a spring pressed latch 403 engages and prevents backlash of the clutch drive arm 397 at the completion of each revolution.

As shown in FIGS. 4 and 31, the solenoid 402 is energized through a normally closed switch 404, the contacts of which may be opened by actuation of arm 405 which is secured to a pivot shaft 406 shown in FIGS. 4 and 9-14. More particularly, the shaft 406 and arm 405, as shown in FIG. 12, are pivoted counterclockwise when engaged by a paper board 271 and causes arm 406a (FIG. 4) which is secured to the shaft 406 to open the normally closed switch 404. However, when the paper board 271 is fed from beneath the arm 405 to the bacon, the arm 405 swings clockwise to the position shown in FIG. 9, thereby closing the switch 404 (FIG. 31) and energizing the solenoid 402 which operates the clutch 394 (FIG. 4) and rotates the paper feed drive shaft 396. Rotation of the shaft 396 acts to elevate the stack of paper boards so that the top paper board is raised to the desired elevation for being advanced, as shown in FIGS. 9–14, to replace the paper board previously fed to receive the group of bacon slices on the conveyor C. It will be apparent that the solenoid 402 remains energized and the drive shaft 396 continues to be rotated by successive revolutions of the clutch 394 until a paper board 271 is positioned beneath and raises the arm 405, thereby opening the switch 404 and deenergizing the solenoid 402.

The drive to the tables 303 and 304 from the drive shaft 396 includes a chain 407 which, as shown in FIG. 3, is trained over a drive sprocket 408 that is secured to the drive shaft 396 and over a sprocket 409 that is secured to a shaft 410 rotatably journaled in bearing block 411.

Preferably an idler sprocket 412 is provided for maintaining a desired tension in the chain 407.

As shown in FIGS. 4 and 6, a crank 413 is secured to the driven shaft 410 and is connected by a connecting rod 414 with a crank 415 that is secured to a shaft 416 rotatably journaled in bearings 417 and 418 secured to the side frames 188 and 189. Slidably keyed to the shaft 416 is a crank arm 419, to the outer end of which is pivotally secured by a pin 420, the upper end of a depending connecting rod 421.

As shown in FIG. 6, the lower end of the rod 421 slidably extends through a block 422 which is pivotally secured by pins 423 to a crank 424, the hub of which is pivotally mounted on the drive shaft 425 of a speed changer gear box generally designated 426. The motion imparted to the connecting rod 421 by the drive shaft 396 through the crank 413 is transmitted through a one-direction clutch arrangement to the gear box drive shaft 425.

More particularly, as shown in FIG. 6, the one-way drive clutch includes a ratchet wheel 427 which is secured on the shaft 425 and a spring biased pawl 428 which operatively engages and prevents clockwise rotation of the ratchet wheel 427 and shaft 425. Counterclockwise rotation of the ratchet wheel 427 is effected by a pawl 430 which is pivotally secured by a bolt 431 to the crank 424. Oscillation of the crank 424 on the shaft 425 is effected by the connecting rod 421. A collar 432 is adjustably secured on the rod 421 and engages and depresses the block 422 thereby effecting clockwise movement of the crank 424 during downward movement of the rod 421. Upward movement of the rod 421 causes a compression spring 433 between the block 422 and lock nuts 434 to effect counterclockwise movement of the crank 424. The spring 433 cushions the load on the crank 424 and prevents excessive or damaging load thereon.

In accordance with the invention, only that portion of the counterclockwise movement of the crank 424 necessary to raise the top paper board to the selected elevation is imparted to the ratchet wheel 427 and shaft 425 by the pawl 430 on the crank 424.

More particularly as shown in FIG. 6, the upper end of the pawl 430 is pivotally connected by bolt 435 to the lower end of an adjustable length connecting rod 436, the upper end of which is pivotally secured by bolt 437 to an arm 438 of a bell crank 439 which is pivotally supported on a shaft 440. Arm 441 of the bell crank 439 is connected by a connecting rod 442 of adjustable length with a lever 443 that is secured to a shaft 444 rotatably journaled in bearings 445 and 446 fastened to the side frame plates 188 and 189.

As shown in FIGS. 4 and 36, secured to the shaft 444 are finger levers 447, to the forward end of each of which is rotatably secured individual rollers 448 that are supported on the top paper board 271 in the magazine and yieldably held thereon by a spring 449 tensioned between the lever arm 443 and the frame.

If the top of the stack of paper boards in the magazine upon which the roller 448 is supported is above the desired elevation, the connecting rod 436 pivots and holds the pawl 430 (FIG. 6) out of engagement with the ratchet wheel 427 so that oscillation of the clutch arm 424 is not transmitted to the shaft 425. The lower the roller 448 is located by the elevation of the top paper board 271 in the magazine the more the rod 436 is raised. When the clutch arm 424 is oscillated, as heretofore described, the pawl 430 is pivoted into engagement with the ratchet wheel 427 so that any further counterclockwise movement (FIG. 6) of the arm 424 is transmitted by the ratchet wheel 427 to the shaft 425. It will be apparent that the amount of motion thus transmitted will vary progressively from a minimum for an upper position of the height detecting roller 448 to a maximum at a low position.

Selective drive

The thus effected angular movement of the gear box shaft 425 is transmitted by the gear box to output shaft 450 which is adapted selectively to raise the tables 303 and 304.

The drive connections from the shaft 450 to the tables 303 and 304 provide for manually selecting the table to be raised and for automatically disconnecting the drive to the other of the two tables from the common drive shaft 450.

As shown in FIG. 6, a sleeve 451 secures the shaft 450 to an aligned shaft 452 on which are slidably keyed a pair of clutch plates 453 and 454.

As shown in FIG. 6, the clutch plate 454 is in clutching engagement with a sprocket 455 which is rotatably mounted on the shaft 452 and through chain 456 drives a sprocket 457 which is fixed to the drive shaft 355 and raises the lower table 303 through the sprockets 353 and 354 and the elevator chains 346 and 347, respectively.

As shown in FIG. 6, the shaft 355 is journaled in bearings 458 and 459 which are respectively secured to the brackets 338 and 339 of the adjustable frame support S' for the paper board magazine. The shaft 355 also rotatably carries a double sprocket 460 through which the upper table 304 is raised by the drive shaft 452 when the clutch 454 is disengaged from the sprocket 455 and the clutch 453 is moved into clutching engagement with a sprocket 461 rotatably journaled on the shaft 452. When thus engaged, a chain from the sprocket 461 drives the sprocket 460 which, in turn, advances an elevator chain 462 which is trained over an upper sprocket 463 that is rotatably mounted on a shaft 464, the ends of which are secured in the brackets 351 and 352 on the top of the guide posts 342 and 343 of the adjustable support S' for the paper board magazine.

As shown in FIG. 6, the ends of the elevator chain 462 are secured to a cross bar 465, the ends of which are clamped to the slide rods 357 and 358 of the upper table 304 and thereby raise the table 304 when the drive shaft 450 from the gear box 426 is rotated.

Shifting of the clutch plates 453 and 454 to disengage the clutch plate 454 from the lower table drive sprocket 455 and to engage the clutch plate 453 with the drive sprocket 461 for the upper table 304 may be effected manually by means of a push-pull knob 466. As shown in FIGS. 3 and 6, the knob 466 is secured to the outer end of a slide rod 467, the inner end of which operatively engages the yoke of a bell crank 468 which, through a connecting rod 469, operates a second bell crank 470 to axially shift a shipper rod 471 when the hand knob 466 is pushed toward and pulled away from the housing wall 190. The shipper rod 471 is slidably journaled in bearings 473 which are secured to a base plate 474 on which the gear box 426 is mounted and which is secured to the brackets 338 and 339 as part of the laterally adjustable magazine frame support S'.

Secured to the shipper bar 471 are a pair of shipper yokes 475 and 476 which engage and shift the clutch plates 453 and 454 on the clutch shaft 452 when the shipper rod 471 is shifted manually by means of the knob 466.

Shifting of the drive from the lower table elevator chains 346, 347 to the elevator chain 462 of the upper table 304 is effected after the lower table 303 has been elevated to a position in which the upper table fingers 374 have been aligned with, and moved by means of the hand wheel 307 into the grooves 375 of the lower table 303 so that the fingers 374 of the table 304 underlie the stack of paper boards 271 on the table 303.

Manual table feed

In accordance with the present invention, in addition to the automatic elevating mechanism, means are provided for rapidly raising the upper table 304 so that the fingers 374 may remove the stack of paper boards from the table 303 quickly without waiting for the automatic drive of the one-revolution clutch 394 to take up slack in the stack when the transfer is made to the table 304.

More particularly, the rapid elevating means is manually operable and includes a sprocket 477 which is secured on the elevator gear box input shaft 425 and with which the shaft 425 may be rapidly rotated by a hand wheel 478 independently of the operation of the ratchet wheel 427 and the one-revolution clutch drive 394.

As shown in FIGS. 6 and 30, the sprocket 477 is driven by a chain 479 from a double sprocket 480 which is driven by a chain 481 from a sprocket 482 to which is secured a bevel gear 483 that meshes with a bevel gear 484 on a shaft 485 to which the hand wheel 478 is secured. The shaft 485 is rotatably journaled in a sleeve bearing 486 which is secured to the side frame 189.

A warning light 487 (FIGS. 1 and 31) is automatically lighted when the top of the paper board stack in the magazine reaches the upper limit of the optimum elevation range for the top paper board.

More particularly, the light 487 is energized through a switch 488 (FIGS. 3 and 31) which is normally open and which is closed by an actuator arm 489 secured to the shaft 444 on which is secured the lever 447 for detecting the elevation of the top paper board in the magazine.

Actuation of the hand knob 466 to engage the clutch 453 and elevator sprocket 461 (FIG. 6) for the upper table 304 also serves to simultaneously disengage the clutch 454 and elevator sprocket 455 for the lower table 303 so that the table 303 may be lowered and reloaded with paper boards while the upper table 304 continues the upward feeding of the paper board supply.

The hand wheel 478 also provides means with which to raise the bottom table 303 manually through the gear box 426 while the clutch 454 and drive sprocket 455 are engaged.

The speed of movement of the tables 303 and 304 when driven through the speed reducing gear box 426 is relatively slow. Moreover, clutching the bottom table 303 to the output shaft 450 of the gear box 426 involves declutching and dropping the upper table 304. In order to avoid interruption of the upward feed of the paper boards, there is provided an additional manually operable drive for raising and lowering, and for holding the bottom or main feed table 303 in any selected position while the clutch 454 of the principal drive is disengaged.

*Rapid table feed*

More particularly, the additional drive includes a hand wheel 490 which, as shown in FIGS. 6 and 32, is secured on a shaft 491 that is rotatably journaled in bearings 492 and 493 which are suitably secured to the side frame 189. As shown in FIG. 32, a clutch sleeve 494 is pinned to the shaft 491 and is biased by a compression spring 495 into clutching engagement with a bushing 496 on which is secured a ratchet wheel 497.

As shown in FIG. 33, a pawl 498 pivotally secured to the bearing 492 is biased by a spring 499 into engagement with the ratchet wheel 497 so as to prevent clockwise rotation of the ratchet wheel 497 and the shaft 491 and thereby prevent the table 303 from dropping or being lowered when the clutch 494 (FIG. 32) is engaged.

The main table 303 may be raised rapidly by rotating the shaft 491 counterclockwise (FIG. 3) by means of the hand wheel 490 while the clutch 494 is engaged. The table 303 also may be rapidly lowered by pressing in on the hand wheel 490 to disengage the clutch 494 and rotating the hand wheel and shaft 491 clockwise while holding the clutch 494 disengaged.

As shown in FIGS. 6 and 32, the drive from the shaft 491 to the elevator shaft 355 consists of a chain 500 which is trained over a sprocket 501 pinned to the shaft 491 and under a sprocket 502 keyed to the elevator shaft 355 with which the table 303 is raised and lowered by the elevator chains 346 and 347. The sprocket 502 is held by a spring 503 against the side frame 189 substantially in alignment with the upper sprocket 501 regardless of lateral adjustment of the table support S' and the resulting axial movement of the shaft 355 on which the sprocket 502 is keyed.

In transferring the paper board feed back to the lower table 303, the table is raised rapidly by means of the hand wheel 490 until the stack of paper board engages the bottoms of the fingers 374 of the upper table 304. Thereafter, the clutch 453 is disengaged and the clutch 454 engaged manually by means of knob 466 so that the main drive of the gear box 426 is transferred from the upper table 304 to the main table 303 and the latter manually raised by means of the hand wheel 478 until the switch 488 is closed and the light 487 is lit. Thereupon the table comb 373 is retracted manually by means of the hand wheel 307 so that the fingers 374 are removed from under the upper stack of paper boards 271 which drops down onto the new stack on the lower table 303.

The slight drop effected by removing the fingers 374 from within the stack of paper boards locates the top paper board at the optimum feeding elevation and further upward feeding of the replenished stack preferably is left to the automatic drive 424, 425, etc.

The retraction of the plate 373 from between the paper boards, with the clutch 453 disengaged, leaves unsupported the table 304 which drops down until collars 504 and 505 secured on the slide rods 357 and 358, respectively, engage springs 506 and 507 which cushion and support the table 304 in a lower position, as shown in FIG. 6, from which the comb 373 again may be fed forward under the stack of paper boards 271 when the supply has been depleted and the main table 303 has been elevated into alignment with the plate fingers 374.

*Paper feed from magazine to conveyor*

Mechanism and its operation for feeding the uppermost paper board 271 from the top of the stack to the conveyor C and for placing a group of shingled bacon slices thereon is illustrated generally by FIGS. 3–5, 9–14, and 16. The mechanism is driven by the one-revolution clutch drive 394 (FIG. 4) and is triggered when the sliced bacon on the conveyor ribbons 169 engage and actuate a trigger lever 508.

More particularly, the feed mechanism operates to deliver a paper board 271 from the top of the stack in the magazine to the position shown in FIGS. 12 and 13 whenever the detector arm 405 is in the low position to which the arm 405 falls when not held up by a paper board. The lowering of the arm 405 closes the microswitch 404 thereby energizing the unlatching solenoid 402 and effecting operation of the one-revolution clutch 394 as heretofore explained.

Thereafter, actuation of the trigger lever 508 by the bacon on the conveyor causes the feeding mechanism to deliver the paper board 271 from the position shown in FIG. 13 to a position beneath the bacon, as shown in FIG. 14. Thereupon the detector arm 405 again drops and "calls" for a new paper board to be fed to the ready position illustrated in FIG. 13.

As shown in FIGS. 5, 9–14 and 36, this feeding mechanism includes suction cups 509 for lifting the leading edge of the top paper board 271 from the stack, as shown in FIG. 10, and pushers 510 (FIGS. 11 and 36) for pushing the top paper board between pinch rolls 585 and 586 which grip and further the advance of the paper board, as shown in FIGS. 11 and 12.

Referring more particularly to the portion of the mechanism for lifting the paper board, each of the suction cups 509, of which there are two shown in the drawings (FIGS. 36–38), is made of pliant rubber or the like and is carried on the end of an individual pipe 513. Both pipes 513 are secured to a hollow shaft 514, the ends of which are secured in arms 515a and 516a of bell cranks 515 and 516 that are pivotally secured on pins 511 and 512 fastened to the side frames 188 and 189. Arms 515b and 516b of the bell cranks are respectively connected by rods 517 and 518 to a pair of individual crank arms 519a and 519b which are secured on a crank shaft 519 journaled in a pair of bearings 520 in the side frames 188 and 189. Rotatably secured on a crank arm 519c on the crank shaft 519 is a cam follower 522 that follows a cam 523 secured on the cam shaft 396 which is driven by the one-revolution clutch 394. The crank shaft 519 is resiliently biased counterclockwise (FIG. 10) by a spring 524 secured to a crank arm 519d which yieldably holds the suction cups 509 elevated above the top of the paper board stack in the position shown in FIG. 10 and the cam roller 522 is engagement with the cam 523, as shown in FIG. 3. Rotation of the one-revolution clutch 394 rotates the cam shaft 396 whereupon the cam 523 oscillates the crank shaft 519 so that the suction cups 509 are pressed into engagement with the top paper board, as shown in FIGS. 9 and 36, and thereafter elevated to their upper position as shown in FIG. 10.

While the cups 509 are pressed down against the paper board, suction is applied to the interior of the cups so that the paper board is gripped firmly.

To that end, the interior of the suction cups are connected through the passageways in the pipes 513 and the hollow shaft 514 with a vacuum cylinder 525 by a hose connection 526. As shown in FIG. 5, the vacuum cylinder 525 is provided with a piston shaft 527 which is advanced and retracted by a lever 528 pivotally supported on pin 529. Pivotally carried by a projecting arm 528a of the lever 528 is a cam follower 530 which operatively engages a cam 531 secured to the shaft 396. An anchored spring 532 is secured to and resiliently urges the lever 528 counterclockwise and holds the followers 530 in engagement with the cam 531.

As the suction cup 509 moves into engagement with the paper board 271, the roller 530 moves into a depression 531a in the cam 531 and the piston rod 527 is drawn upward by the lever 528 thereby creating a vacuum in the chamber 525 and through the hose 526 into the suction cups 509 so that the top paper board is firmly gripped and raised from the top of the stack when the cam 523 acting through the connecting rod 517 and 518 pivots the bell cranks 515 and 516 and thereby raises the cups 509 to the positions shown in FIG. 10. Thereupon the cam 531 acting through the roller 530 depresses the lever 528 from the position shown in FIG. 5 depressing the piston rod 527 so as to create a pressure above atmospheric in the cylinder 525 which is transmitted through the hose 526 to the cup 507 where it acts to separate the paper board from the cup.

As shown in FIG. 38, the top of the paper board stack under the suction cups 509 may be higher on one side than the other, or otherwise slanted from the horizontal due to warpage, unequal thickness or other irregularities in the paper boards.

In accordance with a preferred embodiment of the invention, provision is made for both of the suction cups 509 to seat firmly and securely on the top paper board 271 despite slanting of the upper surface of the stack.

More particularly, as shown in FIGS. 10 and 36, lost motion connections 517a are provided between the connecting rods 517 and the bell crank arms 519b so that if the top paper board stops one of the suction cups 509 before the other, the crank arm 519a associated with the immobilized connecting rod still may move rearwardly merely by compressing a spring 517b or similar component of the lost motion connection 517a. Inasmuch as the two cranks 517 are moved simultaneously by the shaft 519, both rods 518 are retracted until both are immobilized by the firm engagement of both suction cups 509 with the top paper board 271 as shown in FIG. 38.

Thereafter, further movement of the bell cranks 519 clockwise (FIG. 9) serves only to compress both springs 517b which spring load both of the immobilized connecting rods 517 and thereby resiliently hold both cups 509 firmly in engagement with the paper board.

As shown in FIG. 38, in order to compensate for cocking the tubular support 514, one end preferably is secured to the crank arm 516a by a ball and socket or other swivel connection 514a and the other end is secured to an arm 540 which is pivotally secured to the crank arm 515a. When arm 515a is moved either more or less than arm 516a by the connecting rods 517, the resulting greater distance between the outer ends of the arms 515a and 516a is accommodated by pivotal movement of the arm 540 from the position shown in FIG. 37 to the position shown in FIG. 38.

Preferably as shown in FIG. 11, means are provided for keeping the leading edge of the paper board from dropping back onto the stack.

In the illustrated embodiment, this comprises three cranks 533 that are secured to a shaft 534 which is journaled in frame members 188a and 189a. The cranks 533 are spaced transversely of the sides of the stack of paper boards, as shown in FIG. 36. Secured to the outer ends of the cranks 533 is a hold-down bar 533a which rests on the top of the stack as shown in FIG. 10. Immediately before the top paper board is lifted by the suction cup 509 from the stack, a cam 535 on the crank shaft 410 acts through a cam follower 536 on a crank arm 538 which is fixed to the shaft 534 and pivots the cranks 533 counterclockwise to the position shown in FIG. 9. After the paper board has been lifted, a spring 539 and the cam 535 cooperate to return the hold-down bar 533a to the hold-down position on the stack, as shown in FIG. 10, so that the lifted paper board when released by the suction cup 509 is supported above the top of the paper board stack by the top of the hold-down bar 533a.

Preferably means are provided for separating the top paper board 271 from the stack so as to prevent sticking together of two or more boards.

The separation of the top paper board from the stack is further assured by a blower device, which is generally designated 542, and which is located at the top rear edge of the stack, as shown in FIGS. 5, 7, 8, 35 and 36. The blower or air-separator 542 blows a stream of air between the two uppermost paper boards 271 and also provides a subatmospheric pressure above the rear edge portion of the top board which serves to further assure separation from the underlying card.

More particularly, as shown in FIGS. 34–36, the device 542 includes spaced supporting bracket arms 543 which are secured to a pair of the paper board positioning posts 326 by screws 544. The bracket arms 543 are firmly connected by a horizontal shaft 545 on which are pivotally supported a pair of links 546 to which a casting 547 is pivotally secured by pins 548. Above and parallel to the links 546 is a link 549 which is pivotally secured to the casting by a pin 550 and to the bracket arm 543 by stud 551 so that the casting 547 is restricted by the parallel links 546 and 549 to vertical movement. As shown in FIG. 35, the casting 547 is of a generally inverted L-shaped cross section and includes a forward lip 547a which is supported on the top of the stack of paper boards so that a pair of slotted nozzle orifices 552, through which streams of high pressure air are discharged, always discharge the streams between and separate the top two paper boards. An inner lip portion 547b is located at an elevation above the forward lip 547a and limits the height to which the top paper board 271 is raised. A suction pasageway 553 of the casting which is located between the inner and outer lips 547a and 547b maintains a subatmospheric pressure above the top paper board and thereby assist in raising the paper board from the stack.

As shown in FIGS. 34 and 35, there is secured to the casting 547 a bracket 630 with which to raise and lower the casting 547 to the upper and lower positions shown in phantom and in full in FIG. 35. More particularly, the bracket 630 is raised and lowered on roller follower 631 located on the upper arm 632 of a bell crank 633 that is pivotally mounted on a shaft 634 which is secured to the side frames 188 and 189. As shown in FIG. 5, a cam roller follower 635 is mounted on the lower arm 636 of the bell crank 633 and is responsive to a cam 637 on the one-revolution clutch shaft 396. Preferably the cam 637 is adjusted to pivot the bell crank 633 to raise the card separator 542 while the rear of the top paper board 271 is secured by the separator 542 during approximately the same period the cups 509 are lowered and raised, as shown in FIGS. 9 and 10, to lift the front edge of the paper board.

When the top paper board 271 has been raised by the suction cups 509 and the paper board separator 542 to the position shown in FIG. 10, the pushers 510 are actuated to advance the top paper board to the position shown in FIG. 11.

*Paper board pushers*

Referring to FIGS. 16 and 36, each of the two pushers 510 is secured on a separate part of a two-part shaft 555a and 555b, the two parts of which are rotatably journaled relative to each other and the extreme ends of which are rotatably journaled in a pair of spaced crank arms 556 that are pivotally secured by crank studs 557 to the side frames 188 and 189.

The crank arms 556 are oscillated between the positions shown in FIGS. 10 and 11 by individual connecting rods 558 and 559 which are pivotally secured to the crank arms 556 by bolts 560 and to crank arms 561 by bolts 562. Both of the crank arms 561 are secured on a crank shaft 563 which is rotatably journaled in bearings 564 secured to the side frames 188 and 189. As shown in FIGS. 3 and 36, secured to the crank shaft 563 is a crank arm 565 which rotatably carries a cam roller 567 that engages and follows a cam 568 which is secured to the clutch shaft 396. Also secured to the crank shaft 563 is a crank arm 569 to which is secured an anchored spring 570 that biases the crank shaft 563 counterclockwise, as shown in FIG. 9, so as to hold the cam roller 567 against the cam 568 (FIG. 3) and yieldably advance the pusher crank arms 561 forward (FIG. 11).

Each of the two pushers 510 includes a member 571, one of which is secured on portion 555a of the crank throw-shaft and the other on portion 555b. As shown in FIGS. 16 and 36, a pusher blade 572 having a serrated edge 573 is fastened by screws 574 to each of the pusher members 571. Each shaft portion 555a and 555b yieldably is urged in the counterclockwise (FIG. 16) direction by individual springs 575 each of which is tensioned between anchor pins 576 on each of the crank arms 556 and anchor pins 577, each of which is located on a different one of two end plates 578 that are secured to the extreme ends of the two-part shaft 555a, 555b.

Each of the shaft end plates 578 is notched at 578a and 578b, as shown in FIG. 16, and the notches are operatively engageable with a pawl 579 which is pivotally journaled on a bolt 580 secured on crank arm 556. A spring 581 tensioned between pin 582 on the pawl 579 and a pin 583 on the arm 556 yieldably holds the pawl against the notched surface of the end plate 578 associated therewith.

As shown in FIGS. 9 and 16, engagement of each pawl 579 in the notch 578a of its end plate 578 holds its associated pusher blade 572 elevated out of engagement with the underlying paper boards 271.

After the top paper board has been lifted to the position shown in FIG. 10, the crank arms 556 are slightly retracted by the connecting rods 558 and 559 responsive to the cam 568 so that each pawl 579 engages a stop 587 and is thereby swung out of latching engagement with the notch 578a. Thereupon the springs 575 draw and resiliently hold the serrated edges 573 of the blades 572 in engagement with the top paper board 271. Thereafter, forward movement of the crank arms 556 responsive to the cam 568 and spring 570 advances the paper board 271 to the position shown in FIG. 11. There the pawls 579 are pivoted by the springs 581 into the notches 578a so that with the retraction of the crank arms 556 responsive to the cam 568, the pawls 579 and the notches 578a engage and latch the pusher knives 572 in the cocked positions shown in full line in FIG. 16.

It will be seen that the independent mounting of the two pushers 510 in the manner described assures that both blades 572 firmly engage the paper board 271 despite uneven elevation of the stack and the paper boards are uniformly advanced to the nips of the forwarding rollers 585, 586. As shown in FIG. 6, three spaced pairs of pinch rollers 585, 586 are provided in the present embodiment.

*Paper board feed rollers*

Referring to FIGS. 3, 4 and 5, the upper rollers 585 are rotatably supported on a shaft 587 the ends of which are secured in a pair of crank arms 588 that are pivotally secured to the side frames 188 and 189 by studs 589. Springs 590 tensioned between the side frames 188 and 189 and the arms 588 yieldably hold the arms against adjustable stops 591 which determine the spacing of the rollers 585 from the rollers 586.

Preferably the periphery 592 of each of the rollers 586 is knurled or otherwise roughened so as to effect a firm driving engagement with the paper board 271 when the board is pressed against the knurled peripheral surface 592 by the roller 585. The knurled periphery 592 is cut away at 593 (FIG. 9) so that driving of the paper board by the rollers 585, 586 is established only during that portion of the revolution of the rollers 586 when the outer or knurled surface 592 engages the board.

It is a feature of the invention that the distance the paper board 271 is fed by the rollers 585, 586 may be regulated by adjustment of the stops 591 which vary the distance that the knurled surface 592 is in feeding relationship to the roller 585.

As shown in FIG. 6, the rollers 586 are secured to the shaft 410 which is driven by the one-revolution clutch shaft 396 through the drive chain 407.

*Paper board positioning mechanism*

The advance of the paper board 271 by the feed rollers 585, 586 is guided by curved shoes 594, as shown in FIG. 12, to a position in which the paper board is located adjacent to but not in feeding engagement with the knurled feed rollers 270.

The position to which the paper board is advanced by the rollers 585, 586 is slightly beyond the position shown in FIG. 13 at which the paper board is ready for feeding over the rollers 270 to receive a group of shingled bacon slices.

The paper board is returned to the ready position shown in FIG. 13 by hook-shaped levers 595 which are pivotally secured between the rollers 270 on individual brackets 596 fastened to the frame F. Normally the hooked ends 595a of the levers 595 are held out of the path of the paper board 271 beneath the periphery of the rollers 270 by a cam 597 secured on the shaft 410, through suitable connecting linkage.

More particularly, each of the levers 595 is secured by individual connecting rods 598 to individual cranks 599, all of which are secured on a shaft 600 which is pivotally journaled in stationary bearings. Secured to the shaft 600 (FIG. 13) is a crank 601 which is resiliently biased by an anchored spring 602 and holds a cam follower roller 603 firmly against the periphery of the cam 597 so that when cam depression 597a reaches the cam follower 603, the hook 595a of the lever 595 pushes the paper board 271 back to the position shown in FIG. 13 where it is held between the shoes 594 and the spring biased switch arm 405 ready for feeding by the rollers 270 onto the conveyor ribbons 272 as shown in FIG. 14.

Trigger mechanism

As heretofore indicated, the feeding of the paper board 271 is triggered by engagement of the leading edge 253 of each group of bacon slices with the trigger lever 508 which, as shown in FIG. 13, is pivotally mounted on a pin 604, the position of which is adjustable. More particularly, the pin 604 is secured to a crank 605 which is fixed to a shaft 606 on which is a knob 607 (FIGS. 1 and 6) which may be manually rotated so as to rotate the shaft 606 and relocate the pin 604 thereby adjusting the position of the trigger lever 508 to correct for premature or tardy feeding of the paper boards so that the leading edge of the paper board 271 and the group of bacon slices can be made to coincide, as shown in FIG. 14.

The trigger lever 508 is connected by a connecting rod 608 with a crank 609 secured to a crank shaft 610 on which, as shown in FIG. 4, is secured a lever 611 for actuating a normally open switch 612. The lever 611 is resiliently biased by a spring to the open-switch position and pivots to close the switch 612 and energize a solenoid 614, or the like, (FIGS. 3 and 31) when the trigger lever 508 (FIG. 13) is depressed by the bacon. The energization of the solenoid 614 pivots a crank 615 and crank shaft 616 (FIG. 3) counterclockwise and thereby swings a pair of crank arms 617 (FIG. 6) on the shaft 616 counterclockwise from the position shown in FIG. 13 to the position shown in FIG. 14 so that individual pressure rollers 618 on shaft 619 carried by the crank arms 617 firmly press and hold the paper board 271 in feeding engagement with the knurled rotating rollers 270 on shaft 263. The paper board 271 is thereby fed over the rollers 270 onto the conveyor ribbons 272 and a group of shingled bacon slices is fed over the guide shoe 268 and pressed onto the paper board 271 by the spiked rollers 269 as shown by FIGS. 14 and 9. When the bacon disengages the trigger levers 508, the lever 611 disengages the switch 612 which is spring biased to the open position thereby deenergizing the solenoid 614 and the levers 617 are biased by springs 620 to the normal position in which the pressure rollers 618 are held away from the rollers 270 in the position shown in FIG. 10.

Operation

The operation of the machine has been explained in conjunction with the preceding description of the apparatus and requires no further explanation for a full and complete understanding of the illustrated embodiment of the invention.

Obviously those skilled in the art may make changes in the details and arrangement of parts and in adapting the invention to the handling of materials other than bacon and other than sliced products without departing from the spirit and scope of the invention as defined by the claims hereto appended and their patentable equivalents.

The following is an example of the many contemplated alternatives to the structure of the drawings, which primarily is illustrative rather than definitive of the invention.

In some instances it may be desirable to hold the receiving conveyor ribbons 157 stationary while the product in sliced or any selected form is supplied to the ribbons 157. Thus a selected number of slices of cheese or meat may be stacked on the conveyor without lapping or shingling the slices. This operation is effected with the illustrated apparatus merely by loosening set screw 182a (FIG. 4) so that the sprocket 182 rotates on the shaft 185 and the drag of the rollers 234 (FIG. 5) hold the ribbons 157 stationary while the product is deposited thereon. Thereafter, the one-revolution clutch 203 (FIG. 4) operates to advance the ribbons 157 a desired amount at the speed of the ribbons 169 (FIG. 5) during transfer between the conveyors.

The invention further contemplates that the peripheral speed of the transfer wheel 269 be slightly faster than the speed of the ribbons 169 and rollers 231 to compensate for the thickness of the slices and the curvature of the rollers 231 so that each group of slices is slid over the shoe 268 without buckling, spreading or gathering.

We claim:

1. In a slicing machine for meat or the like, the combination comprising a driven movable slicing blade, power operated means for advancing a product to be sliced into the path of the blade, an adjustable control device for varying the rate at which the said means advances the product, a weigher arranged to receive the sliced product and to respond to overweight and underweight departures thereof from a selected weight, and electrical means operatively connected with said weigher and actuated by the weigher for adjusting said control device to increase the rate of product advance responsive to an underweight departure and to decrease the rate of product advance responsive to an overweight departure.

2. In a slicing machine for meat or the like, the combination comprising a driven rotary slicing blade, hydraulically operated means for advancing a product to be sliced into the path of the blade including a control valve which is movable to adjust the resistance to the hydraulic advancing means whereby selectively to increase or decrease the rate of product advance, a weigher arranged to receive the sliced product and to respond to overweight and underweight departures thereof from a selected weight, and electrical means operatively connected with said weigher and actuated by said weigher for operating said control valve and constructed and arranged to move the valve to increase resistance to the hydraulic advance and thereby to reduce the rate of product advance responsive to an overweight departure of the weigher and also to move the valve to decrease resistance to the hydraulic advance and thereby to increase the rate of product advance responsive to an underweight departure of the weigher.

3. In a slicing machine for meat or the like, the combination comprising a driven substantially constant speed rotary slicing blade, substantially constant force hydraulic means for advancing a product to be sliced into the path of the blade, an adjustable rate control valve included in said hydraulic means and adapted to vary the resistance to the force advancing the product whereby to vary the rate of product advance, valve operating means including a first solenoid for adjusting the control valve to increase the rate of advance and a second solenoid for adjusting the control valve to decrease the rate of advance, electrical control means for said solenoids including a first switch for energizing said first solenoid and a second switch for energizing said second solenoid, and a weigher arranged to receive the sliced product and to determine underweight and overweight departures from a selected weight and including means to actuate said first switch and thereby to increase the rate of product advance responsive to an underweight departure and also including means to actuate said second switch and thereby to decrease the rate of product advance responsive to an overweight departure.

4. In a slicing machine for meat or the like, the combination comprising a driven slicing blade, power operated means for advancing a product to be sliced into the path of the blade, a reciprocably movable control device operatively associated with said power operated means to vary the rate of advance of the product, sensing means resiliently engaging a surface of the advancing product and movable as a result of change in a cross sectional dimension of the product, motion transmitting means interconnecting the said sensing means and the control device whereby to move the latter to increase the rate of product advance as a result of reduction of the cross sectional dimension and to decrease the rate of product advance as a result of increase of the cross sectional dimension, a weigher arranged to receive the sliced product and to determine underweight and overweight departures thereof from a selected weight, and means operatively associated with the weigher and connected with the control device to move the latter to increase and to decrease the rate of product advance as a result of underweight and overweight departures, respectively.

5. In a slicing machine for meat or the like, the combination comprising a driven blade, hydraulically operated means for advancing a product to be sliced into the path of the blade, a reciprocable control valve operatively associated with said hydraulic means to vary the resistance to product advance and thereby to vary the rate of advance, sensing means resiliently engaging a surface of the advancing product and movable as a result of change in a cross sectional dimension of the product, motion transmitting means interconnecting the sensing means and the control valve whereby to move the latter respectively to increase and to decrease the rate of product advance as a result of decrease and increase of the cross sectional dimension, respectively, a weigher arranged to receive the sliced product and to determine underweight and overweight departures from a selected weight, and means operatively connecting the weigher and the motion transmitting means to move the control valve respectively to increase and to decrease the rate of product advance as a result of underweight and overweight departure, respectively.

6. In a slicing machine for meat or the like, the combination comprising a substantially constant speed rotary slicer, substantially constant force hydraulic means for advancing a product to be sliced into the path of the blade, a reciprocable control valve included in said hydraulic means and adjustable to vary the resistance to product advance to vary the rate of advance, sensing means resiliently engaging a surface of the advancing product and movable as a result of change in a cross sectional dimension of the product, motion transmitting means interconnecting the sensing means and the control valve including a pivotally supported lever connected to the control valve to move the latter respectively to increase and to decrease the rate of advance as a result of decrease and increase, respectively, of the cross sectional dimension, a weigher arranged to receive the sliced product and to determine underweight and overweight departures from a selected weight, and means operatively connecting the weigher and the lever to adjust the latter and thereby to move the control valve respectively to increase and to decrease the rate of product advance as a result of underweight and overweight departures, respectively.

7. A slicing machine as defined in claim 6 and wherein the last mentioned means comprises an adjustable pivot supporting the said lever, solenoid operated means for adjusting the pivot, and electrical control means for the solenoid operated means including switch means operable by the weigher responsive underweight and overweight departures of the sliced product.

8. A machine for slicing and conveying a product such as meat and comprising in combination, a driven rotary slicing blade, power operated ram means for advancing a product into the path of the blade, control means adapted to start and to stop the ram whereby to advance and slice the product during a selected number of blade revolutions and to stop the product during a selected number of blade revolutions, the said ram control means including an electric circuit having switch means which is opened and closed by rotation of said blade, a conveyor arranged to receive the sliced product, drive means for the conveyor adapted to drive the same substantially continuously at a constant first speed, and electrically operable clutch means connected with said conveyor drive means so that when it is energized it increases the conveyor speed to a substantially constant second speed, said electrically operable clutch means being connected in said electric circuit to be energized by said switch means when the ram is stopped and to be de-energized when the ram is started.

9. A machine for cutting a meat product or the like into slice groups and for conveying the groups, comprising a rotary slicing blade disposed generally transversely of the direction of product movement, a power operated ram for advancing the product into the path of the blade to be cut from one side through the other side thereby, ram control means for starting and stopping ram advance including an electrical circuit having a switch operable by rotation of the blade to provide for intermittent ram advance and dwell, a belt type conveyor for receiving cut slices and having an end roll disposed generally parallel to and adjacent said blade with the end of the roll adjacent the said one side of the product disposed below the other end of the roll so that slices of the product fall substantially flat upon the conveyor, and means for driving the conveyor at a first speed to receive the slices in overlapped groups and for also driving the conveyor at a greater second speed, the said conveyor drive means including electric speed control means connected with said switch to operate the conveyor at the said first speed during ram advance and at the said second speed during ram dwell.

10. A machine for slicing a meat product or the like and for conveying the sliced product in groups of slices comprising, a rotary slicing blade, a power operated ram for advancing the product into the path of the blade for slicing from one side through the other side thereby, ram control means including an electrical circuit having a switch operable by the rotating blade to start and stop the ram, the ram being advanced for a selected number of blade revolutions and the ram being stopped for a selected number of blade revolutions intermittently, a conveyor arranged to receive cut slices, conveyor drive means comprising a driven planetary gear set for operating the conveyor at a substantially constant speed, and an electrically operable clutch mechanism selectively connected with said gear set to increase the speed thereof and the speed of the conveyor when energized, the said clutch mechanism being connected in said circuit to be energized by said switch only when the ram is stopped.

11. In a slicing machine for a meat product or the like, the combination of a rotary slicing blade, a power operated ram for advancing the product into the path of the blade, ram control means for intermittently advancing and stopping the ram automatically in timed sequence during rotation of the slicing blade, a conveyor for receiving the sliced product, means for driving the conveyor at a substantially constant speed, and means operatively connected with the conveyor drive means to increase the speed thereof, said last mentioned means being connected with the ram control means for operation only when the ram is stopped.

12. In a slicing machine for a meat product or the like, the combination of a rotary slicing blade, a power operated ram for advancing the product into the path of the blade, ram control means intermittently advancing and stopping the ram automatically in timed sequence during rotation of the slicing blade, a first conveyor for receiving the sliced product from the blade, a driven substantially constant speed second conveyor for receiving the sliced product from the first conveyor, means for driving the first conveyor at a substantially constant first speed, and means for increasing the speed of said first conveyor to a speed substantially equal to the speed of the second conveyor to effect transfer of the product from the first to the second conveyor, the last mentioned means being operatively connected for control by the ram control means to increase the speed of said first conveyor only when the ram is stopped.

13. The slicing machine combination as defined in claim 12 wherein the said first and second conveyors each comprise a plurality of transversely spaced endless belts, and wherein the belts of the second conveyor are interspaced between the belts of the first conveyor and are longitudinally overlapped therewith.

14. The slicing machine combination set forth in claim 13 and including means for shifting the relative positions of said first and second conveyor operated by the means for increasing the speed of the first conveyor.

15. In a slicing machine for a meat product or the like, the combination of a rotary slicing blade, a power operated ram for advancing the product into the path of the blade, ram control means intermittently advancing and stopping the ram automatically in timed sequence during operation of the blade and including an electric circuit having switch means operated by the blade, a first generally horizontal conveyor for receiving the sliced product from the blade and comprising a plurality of transversely spaced endless belts, a second generally horizontal conveyor for receiving the sliced product from the first conveyor and comprising a plurality of transversely spaced endless belts which are interspaced between the belts of the first conveyor and overlap the same longitudinally with part of the overlapping portion of the belts of the second conveyor normally disposed below the belts of the first conveyor, constant speed drive means for the second conveyor, drive means for the first conveyor normally driving the same at a constant speed less than the speed of the second conveyor, electrically operable means for increasing the speed of the first conveyor to the speed of the second conveyor connected with the ram control circuit for operation only when the ram is stopped, and belt shifting means for lifting the overlapped portion of the second conveyor belts above the first conveyor, said belt shifting means being operatively associated with the speed increasing means for operation only when the conveyor speeds are substantially equal.

References Cited in the file of this patent

UNITED STATES PATENTS

| | | |
|---|---|---|
| 1,519,354 | Brown | Dec. 16, 1924 |
| 1,525,929 | Folk | Feb. 10, 1925 |
| 1,975,917 | Bech | Oct. 9, 1934 |
| 2,047,399 | Walter | July 14, 1936 |
| 2,047,400 | Walter | July 14, 1936 |
| 2,073,082 | Walter | Mar. 9, 1937 |
| 2,184,905 | Brintnall | Dec. 26, 1939 |
| 2,239,665 | Straeten | Apr. 22, 1941 |
| 2,274,590 | Cook | Feb. 24, 1942 |
| 2,358,283 | Walter | Sept. 12, 1944 |
| 2,391,125 | Carpenter | Dec. 18, 1945 |
| 2,442,250 | Spain | May 25, 1948 |
| 2,482,109 | Harrison | Sept. 20, 1949 |
| 2,534,172 | Klingens | Dec. 12, 1950 |
| 2,542,330 | Henderson et al. | Feb. 20, 1951 |
| 2,744,553 | Folk | May 8, 1956 |
| 2,752,968 | Toby et al. | July 3, 1956 |
| 2,761,681 | Tebbs | Sept. 4, 1956 |
| 2,812,792 | Allbright | Nov. 12, 1957 |
| 2,898,722 | Hensgen | Aug. 11, 1959 |
| 2,903,032 | Cervene | Sept. 6, 1959 |

OTHER REFERENCES

The National Provisioner, Mar. 19, 1955, pages 8, 9 and 10, article entitled "Shingle and Weigh Bacon Automatically."